United States Patent
Pinnavaia et al.

[11] Patent Number: 5,795,559
[45] Date of Patent: *Aug. 18, 1998

[54] POROUS INORGANIC OXIDE MATERIALS PREPARED BY NON-IONIC SURFACTANT TEMPLATING ROUTE

[75] Inventors: Thomas J. Pinnavaia, East Lansing, Mich.; Stephen A. Bagshaw, Montpellier, France

[73] Assignee: Board of Trustees operating Michigan State University, East Lansing, Mich.

[ * ] Notice: The term of this patent shall not extend beyond the expiration date of Pat. No. 5,622,684.

[21] Appl. No.: 641,917

[22] Filed: May 2, 1996

Related U.S. Application Data

[63] Continuation-in-part of Ser. No. 465,770, Jun. 6, 1995, Pat. No. 5,622,684.

[51] Int. Cl.$^6$ .................................... C01B 39/04
[52] U.S. Cl. .................. 423/702; 423/700; 423/702; 423/704; 423/705; 423/706; 423/707; 423/119; 423/121; 423/123; 502/64; 502/66; 502/74; 502/242; 502/254; 502/258; 502/309; 502/311; 502/312; 502/316; 208/120; 208/124
[58] Field of Search ...................... 423/704, 705, 423/706; 502/64, 66, 74, 242, 254, 258, 309, 311, 312, 316; 208/120, 124

[56] References Cited

U.S. PATENT DOCUMENTS

| | | |
|---|---|---|
| 3,702,886 | 11/1972 | Argauer et al. |
| 3,709,979 | 1/1973 | Chu |
| 4,108,881 | 8/1978 | Rollmann |
| 4,151,189 | 4/1979 | Rubin |
| 4,391,785 | 7/1983 | Rosinski |
| 5,057,296 | 10/1991 | Beck ............................ 423/277 |
| 5,098,684 | 3/1992 | Kresge et al. ................. 502/64 |
| 5,102,643 | 4/1992 | Kresge et al. ................. 502/64 |
| 5,143,879 | 9/1992 | Whitehurst .................... 502/85 |
| 5,622,684 | 4/1997 | Pinnavaia et al. ............. 423/702 |

FOREIGN PATENT DOCUMENTS 286522 1/1991 Germany.

OTHER PUBLICATIONS

Breck, D. W., Zeolite Molecular Sieves: Structure, Chemistry and Use; Wiley and Sons; London, pp. 1 to 100 (1974) (no month).
Meier, et al., Atlas of Zeolite Structure types, Butterworth, London, pp. 451 to 469 (1992) (no month).
Barrer, et al., Zeolites, vol. 1, 130–140, Oct. 1981 "Zeolites & Their Synthesis".
Lok et al., Zeolites, vol. 3, 282–291, Oct. 1983.
Davis et al., Chem Mater., vol. 4, 756–768 (1992) (no month).
Gies et al., Zeolites, vol. 12, 42–49, Jan. 1992.
Hearmon, et al. Zeolites, vol. 10, 608–611 Jul./Aug. 1990.
Davis et al., Nature, vol. 331, 698–699 1988 (no month).

(List continued on next page.)

*Primary Examiner*—Michael Marcheschi
*Attorney, Agent, or Firm*—Ian C. McLeod

[57] ABSTRACT

A method for the preparation of new semi-crystalline, porous inorganic oxide compositions possessing uniform framework-confined mesopores in the range 2.0–10.0 nm. The method uses an interaction between various nonionic polyethylene oxide based surfactants (N°) and neutral inorganic oxide precursors (I°) at ambient reaction temperatures. The materials formed exhibit a disordered assembly of worm-like channels of regular diameter owing to the specific mechanism of self-assembly, producing highly stable materials and particles incorporating large numbers of the channels. This (N° I°) templating approach introduces several new concepts to mesostructure synthesis. The application of the low-cost, non-toxic and biodegradable surfactants and ambient reaction temperatures, introduces environmentally clean synthetic techniques to the formation of mesostructures. Recovery of the template can be achieved through solvent extraction where the solvent may be water or ethanol.

50 Claims, 19 Drawing Sheets

OTHER PUBLICATIONS

Estermann, M., et al., Nature vol. 352, 320–323 Jul. 1991.
Thomas, J. M., et al., J. Chem. Soc. Chem. Commun., 875–876 (1992) (no month).
Soghmonian, et al., Agnew. Chem. Int. Ed. Eng. vol. 32, 610–611 (1993) (no date).
Beck, et al., J. Am. Chem. Soc., vol. 114, 10834–10843, Jun. 1992.
Stucky, et al., Nature, vol. 368, 317–321, Mar. 1994.
Pinnavaia et al., Nature, vol. 368: 321–323 Mar. 1994.
Pinnavaia et al., Science, vol. 267: 865–867 (1995) (no month).
Coustel et al., J. Chem. Soc. Chem. Commun., 967–968 (1994) (no month).
Chavin et al., J. Catal., vol. 111, 94–105 (1988) (no month).
Sing et al., Pure Appl. Chem., vol. 57, 603–619 (1985) (no month).
Horvath and Kawazoe, J. Chem. Eng. Jpn., 16 470–475 (1983) (no month).
Chen, C–Y., et al., Microporous Materials 2, 17 Jul. 1993.
Hou, Q., et al., Chem. Mater. 6, 1176, Jun. 1994.
Chu, B., Langmuir 11, 414 (1995) (no month).
Lin, Z., et al., Langmuir 8, 2200 (1992) (no month).
Branton, P. J., et al., J. Chem. Soc. Faraday Trans. 90, 2965 (1994) (no month).
Cranston, R. W., et al., Advances in Catalysis, 9, 143 (1970) (no month).
Barrett, E. P., et al., J. Amer. Chem. Soc. 73: 373 (1951) (no month).
Bagshaw, S. A., et al., Science 269, 1242, Sep. 1995.
Akitt, J. W., Prog Nucl. Magn. Reson. Spectroasc. 21, 127 (1989) (no month).
Cruickshank, M.C., et al., J. Chem. Soc. Chem. Commun. 23 (1986) (no month).
Adkins, H., et al., J. Amer. Chem. Soc. 73, 2184 (1951) (no month).
Basmadjian, D., et al., J. Catal. 1, 547 (1962) (no month).
Snel, R., Appl. Catal. 12, 347, Jul. 1984.
Chen, C–M., et al., Studi. Surf. Sci. Catal. 91, 427 (1995) (no month).

Igepal RC-760

PEO₁₈

Fatty Acid Ethoxylate

Pluronic 64 L

Tetronic

Fatty Amine Ethoxylate

Fatty Acid PPO/PEO block co-polymer

POROUS INORGANIC OXIDE MATERIALS PREPARED BY NON-IONIC SURFACTANT TEMPLATING ROUTE

CROSS-REFERENCE TO RELATED APPLICATION

This application is a continuation-in-part of U.S. application Ser. No. 08/465,770, filed Jun. 6, 1995 U.S. Pat. No. 5,622,684.

GOVERNMENT RIGHTS

The present invention was sponsored under National Science Foundation Contract CHE 9224102. The Government has certain rights to this invention.

BACKGROUND OF INVENTION (1). Field of Invention

This invention relates to the synthesis of crystalline, porous inorganic oxide materials possessing a disordered assembly of worm-like channels. In particular, the present invention relates to such materials where the formation of the mesoporous structure is accomplished by a novel self-assembly mechanism involving complexation and/or hydrogen (H) bonding between aqueous or alcoholic emulsions of various nonionic polyethylene oxide based surfactants ($N^°$) and various neutral inorganic oxide precursors ($I^°$). This is followed by hydrolysis and subsequent condensation of hydrolysis products at ambient reaction temperatures. This ($N^°I^°$) templating approach allows for the removal of template through calcination or solvent extraction which lowers material and energy costs. The template is biodegradable. The ($N^°I^°$) templating approach also affords non-lamellar mesostructures of metal oxides in addition to silica.

(2). Description of Prior Art

Modern human activities rely greatly upon porous solids of both natural and synthetic design. The pore structures of such solids are generally formed during crystallization or during subsequent treatments. These solid materials are classified depending upon their predominant pore sizes: (i) microporous, with pore sizes <1.0 nm; (ii) macroporous, with pore sizes exceeding 50.0 nm; and mesoporous, with pore sizes intermediate between 1.0 and 50.0 nm. Macroporous solids find limited use as adsorbents or catalysts owing to their low surface areas and large non-uniform pores. Micro- and mesoporous solids however, are widely utilized in adsorption, separation technologies and catalysis. There is an ever increasing demand for new, highly stable well defined mesoporous materials because of the need for ever higher accessible surface areas and pore volumes in order that various chemical processes may be made more efficient or indeed, accomplished at all.

Porous materials may be structurally amorphous, para-crystalline or crystalline. Amorphous materials, such as silica gel or alumina gel, do not possess long range crystallographic order, whereas para-crystalline solids such as γ- or η- alumina are semi-ordered, producing broad X-ray diffraction peaks. Both these classes of materials exhibit very broad pore distributions predominantly in the mesoporous range. This wide pore distribution however, limits the effectiveness of catalysts, adsorbents and ion-exchange systems prepared from such materials.

Zeolites and some related molecular sieves such as; alumino-phosphates and pillar interlayered clays, possess rigorous uniform pore sizes. Zeolites are highly crystalline microporous aluminosilicates where the lattice of the material is composed of $IO_4$ tetrahedra (I=Al, Si) linked by sharing the apical oxygen atoms. Cavities and connecting channels of uniform size form the pore structures which are confined within the specially oriented $IO_4$ tetrahedra (Breck, D. W., Zeolite Molecular Sieves: Structure, Chemistry and Use; Wiley and Sons; London, pages 1 to 100 (1974)). Zeolites are considered as a subclass of molecular sieves owing to their ability to discriminate small molecules and perform chemistry upon them. Molecular sieves in general are materials with crystalline frameworks in which tetrahedral Si and/or Al atoms of a zeolite or zeolitic lattice are entirely or in part substituted by other atoms such as B, Ga, Ge, Ti, Zr, V, Fe or P. Negative charge is created in the zeolite framework by the isomorphous substitution of $Si^{4+}$ ions by $Al^{3+}$ or similar ions. In natural zeolites, this charge is balanced by the incorporation of exchangeable alkali or alkaline earth cations such as $Na^+$, $K^+$, $Ca^{2+}$. Synthetic zeolites utilize these and other cations such as quaternary ammonium cations and protons as charge balancing ions. Zeolites and molecular sieves are generally prepared from aluminosilicate or phosphate gels under hydrothermal reaction conditions. Their crystallization, according to the hereafter discussed prior art, is accomplished through prolonged reaction in an autoclave for 1–50 days and oftentimes, in the presence of structure directing agents (templates). The correct selection of template is of paramount importance to the preparation of a desired framework and pore network. A wide variety of organic molecules or assemblies of organic molecules with one or more functional groups are known in the prior art to provide more than 85 different molecular sieve framework structures. (Meier et al., Atlas of Zeolite Structure types, Butterworth, London, pages 451 to 469 (1992)).

Recent reviews on the use of templates and the corresponding structures produced, as well as the mechanisms of structure direction have been produced by Barrer et al., Zeolites, Vol. 1, 130–140, (1981); Lok et al., Zeolites, Vol. 3, 282–291, (1983); Davis et al., Chem Mater., Vol. 4, 756–768, (1992) and Gies et al., Zeolites, Vol 12, 42–49, (1992). For example, U.S. Pat. No. 3,702,886 teaches that an aluminosilicate gel (with high Si/Al ratio) crystallized in the presence of quaternary tetrapropyl ammonium hydroxide template to produce zeolite ZSM-5. Other publications teach the use of different organic templating agents and include; U.S. Pat. No. 3,709,979, wherein quaternary cations such as tetrabutyl ammonium or tetrabutyl phosphonium ions crystallize ZSM-11 and U.S. Pat. No. 4,391,785 demonstrates the preparation of ZSM-12 in the presence of tetraethyl ammonium cations. Other prior art teaches that primary amines such as propylamine and i-propylamine (U.S. Pat. No. 4,151,189), and diamines such as diaminopentane, diaminohexane and diaminododecane (U.S. Pat. No. 4,108,881) also direct the synthesis of ZSM-5 type structure. Hearmon et al (Zeolites, Vol. 10, 608–611, (1990)) however, point out that the protonated form of the template molecule is most likely responsible for the framework assembly.

In summary, most of the zeolites and molecular sieve frameworks taught in the prior art are assembled by using quaternary ammonium cations or protonated forms of amines and diamines as templates.

The need for new and useful types of stable frameworks and the need to expand the uniform pore size into the mesopore region allowing the adsorption and discrimination of much larger molecules, has driven the search for organic structure-directing agents that will produce these new structures. In the prior art however, molecular sieves possess uniform pore sizes in the microporous range. These pore sizes and therefore the molecular sieving abilities of the materials are predetermined by the thermodynamically favored formation of framework windows containing 8, 10 and 12 I-atom rings. The largest pore size zeolites previously available were the naturally occurring faujasite (pore size 0.74 nm) or synthetic faujasite analogs, zeolites X and Y with 0.8 nm pore windows (Breck, D. W., *Zeolite Molecular Sieves: Structure, Chemistry and Use*; Wiley and Sons; London, pages 1 to 100 (1974)). The innovative use of aluminophosphate gels has allowed the synthesis of new large pore materials. Thus, an 18 I-atom ring aluminophosphate molecular sieve; VPI-5 (Davis et al., *Nature*, Vol. 331, 698–699, (1988)) was produced and found to consist of an hexagonal arrangement of one dimensional channels (pores) of diameter ≈1.2 nm. A gallophosphate molecular sieve cloverite, with pore size of 1.3 nm was reported by Estermann M. et al (*Nature*, Vol 352, 320–323, (1991)), while recently, Thomas J. M. et al (*J. Chem. Soc. Chem. Commun.*, 875–876, (1992)) reported a triethyl ammonium cation directed synthesis of a novel 20 I-atom ring aluminophosphate molecular sieve (JDF-20), with uniform pore size of 1.45 nm (calculated from lattice parameters). A vanadium phosphate material was very recently reported with 1.84 nm lattice cavity (Soghmonian et al., *Agnew. Chem. mnt. Ed. Engl.*, Vol. 32, 610–611, (1993)). However, the true pore sizes of the latter two materials are unknown since sorption data were not made available and furthermore, these materials are not thermally stable.

In summary, in spite of significant progress made toward the preparation of large pore size materials, thermally stable molecular sieves are still only available with uniform pore sizes in the microporous range.

A recent breakthrough in the preparation of mesoporous silica and aluminosilicate molecular sieves was disclosed in U.S. Pat. Nos. 5,098,684; 5,102,643. The class of mesoporous materials (denoted as M41S) claimed in this prior art was found to possess uniform and adjustable pore size in the range 1.3–10.0 nm. These materials exhibited framework wall thickness from 0.8 to 1.2 nm and elementary particle size generally greater than 50.0 nm. By varying the synthesis conditions, M41S materials with hexagonal (MCM-41), cubic (MCM-48) or layered morphologies have been disclosed (Beck et al., *J. Am. Chem. Soc.*, Vol. 114, 10834–10843, (1992)). The mechanism proposed for the formation of these materials involves strong electrostatic interactions and ion pairing between long chain quaternary alkyl ammonium cations, as structure directing agents, and anionic silicate oligomer species (U.S. Pat. No. 5,098,684). Recently, Stucky et al (*Nature*, Vol. 368, 317–321 (1994)) extended this assembly approach by proposing four complementary synthesis pathways. The direct co-condensation of anionic inorganic species ($I^-$) with a cationic surfactant ($S^+$) to give assembled ion pairs ($S+ I^-$), for example MCM-41, was described as Pathway 1. The charge reversed situation with an anionic template ($S^-$) being used to direct the assembly of cationic inorganic species ($I^+$) to ion pairs ($S^-$, $I^+$) was Pathway 2. Hexagonal iron and lead oxide and lamellar lead and aluminum oxide phases have been reported using Pathway 2 (Stucky et al. ibid.). Pathways 3 and 4 involve the mediation of assemblies of surfactants and inorganic species of similar charge by oppositely charged counterions ($X^-=Cl^-$, $Br^-$, or $M^+=Na^+$, $K^+$). The viability of Pathway 3 was demonstrated by the synthesis of hexagonal MCM-41 using a quaternary alkyl ammonium cation template under strongly acidic conditions (5–10 mol L$^{-1}$ HCl or HBr) in order to generate and assemble positively charged framework precursors (Stucky et al. ibid). Pathway 4 was demonstrated by the condensation of anionic aluminate species with an anionic template ($C_{12}H_{25}OPO_3^-$) via alkali cation mediated ($Na^+$, $K^+$) ion pairing, to produce a lamellar $Al(OH)_3$ phase. Pinnavaia et al. (*Nature*, Vol 368, 321–323, (1994)) reported the preparation of a templated mesoporous silica and a Ti-substituted analogue by the acid catalyzed hydrolysis of an inorganic alkoxide precursor in the presence of primary ammonium ions.

All of the aforementioned synthetic pathways involve charge matching between ionic organic directing agents and ionic inorganic precursors. The template therefore, is strongly bound to the charged framework and difficult to recover. For example, in the original Mobil patent (U.S. Pat. No. 5,098,684) the template was not recovered, but burned off by calcination at elevated temperature. Template removal of anionic surfactant (Pathway 2) has however, been demonstrated by ion-exchange with low pH acidic cation donor solutions (U.S. Pat. No. 5,143,879). Template-halide pairs in the framework of acidic Pathway 3 materials can be displaced by ethanol extraction (Stucky et al. ibid). Thus, ionic template recovery is possible, provided that exchange ions or ion pairs are present during the extraction process.

Most recently, the formation of mesoporous molecular sieves via a new route (Pathway 5) was proposed by Pinnavaia et al. (*Science*, Vol. 267, 865–867, (1995)). In this method, the self assembly of micelles of neutral primary amines ($S°$) and neutral inorganic alkoxide precursors ($I°$) was based upon hydrogen bonding between the two components. The new approach ($S°$, $I°$) taught in that prior art afforded mesostructures with greater wall thicknesses, smaller particle sizes and complimentary framework-confined mesoporosities relative to Pathway 1 and 3 materials. The new materials however, provided several advantages over the materials taught in the prior art. Greater wall thicknesses are desired in order that the thermal and hydrothermal stabilities of the materials may be improved (Coustel et al., *J. Chem. Soc. Chem. Commun.*, 967–968, (1994)). Small particle sizes allow for greater volumes of textural mesoporosity in turn leading to greater access, via mass transport through the textural pores, to the framework-confined pores, thereby improving the overall performance of the adsorbent (Pinnavaia et al., ibid; Chavin et al., *J. Catal.*, Vol. 111, 94–105, (1988)). In addition, owing to the weak template-framework interactions, Pathway 5 allowed for the facile solvent extraction of the template, removing the need for cation donors or ion pairs.

The terms framework-confined and textural porosity are herein defined. Framework-confined uniform pores are pores formed by the nucleation and crystallization of the framework elementary particles and are typically highly regular cavities and channels confined by the solid framework. The size of these cavities and channels is predetermined by the thermodynamically favored assembly routes. Textural porosity is that which can be attributed to voids and channels between elementary particles and/or aggregates of such particles (grains). Each elementary particle in the case of molecular sieves is composed of a certain number of framework unit cells each in turn containing framework-confined uniform pores. Textural porosity is formed during crystal growth and segregation or during subsequent thermal treatment or acid leaching. The size of the textural pores is determined by the size, shape and the number of interfacial contacts of these particles or aggregates. Thus, the size of the textural pores is generally one or two orders of magnitude larger than that of the framework-confined pores and is proportional to the elementary particle size.

One skilled in the arts of powder X-ray diffraction (XRD), Scanning Electron Microscopy (SEM), Transmission Electron Microscopy (TEM) and adsorption/desorption can determine the existence of and differentiate between framework-confined and textural mesoporosities. The crystallographic distance between repeat units in the elementary particles and some information about the arrangement of such repeat units can be obtained from XRD. Particle sizes and shapes and preliminary information regarding textural mesoporosity can be established by SEM and TEM. Analysis of the $N_2$ or Ar adsorption-desorption isotherms of the solid material can indicate both framework-confined and textural mesoporosities. Textural mesoporosity is evidenced by the presence of a Type IV isotherm exhibiting a well defined hysteresis loop in the relative pressure region $P_f/P_0 > 0.5$ (Sing et al., *Pure Appl. Chem.*, Vol. 57, 603–619, (1985)). This behavior is common for a variety of paracrystalline materials and freeze-dried pillared layered solids. Framework-confined mesoporosity is characterized by a sharp adsorption uptake followed by a step loop in the 0.2–0.7 $P_f/P_0$ region. This step corresponds to filling of the framework-confined mesopores. In MCM-41 materials, the large particle size precludes the formation of textural mesoporosity and a corresponding ratio of textural to framework-confined mesoporosity approaching zero is calculated. In materials prepared via Pathway 5, the elementary particle size was smaller (<40.0 nm) producing a ratio of textural to framework-confined mesoporosity greater than 0.2.

In summary, according to the prior art, the molecular sieve materials and preparation techniques provide several distinct disadvantages and advantages:

i) The prior art of Pathways 1 through 4 teaches the use of charged surfactant species as templates in order to assemble inorganic frameworks from charged inorganic precursors. These charged templates are generally expensive, strongly bound to the inorganic framework and therefore difficult to recover. Additionally, many of these templates such as the most commonly used quaternary ammonium cations are highly toxic and environmentally undesirable. In the prior art of Pathways 1 to 4, the template was removed from the structure by either calcining it out or by ion-exchange reactions. Pathway 5 prior art templates are also highly toxic and environmentally unsuitable, but may be removed through environmentally benign ethanol extraction and thereby recovered and reused.

ii) Prior art mesoporous molecular sieves produced by Pathways 1–4 exhibit small pore-wall thicknesses (0.8–1.2 nm), to which may be related the very poor thermal and hydrolytic stabilities of the materials taught in that prior art, while Pathway 5 provides materials with greater wall thicknesses (2.0 nm) and thereby greater stabilities. This contrast is ascribed to the differences in the self-assembly mechanisms with the former prior art relying on strong ionic interactions and the latter relying on weaker H-bonding interactions.

iii) The prior art of Pathways 1–4 produces materials with low textural to framework-confined mesopore ratios, while the prior art of pathway 5 exhibits higher textural to framework-confined mesopore ratios and therefore, theoretically better access to the framework pores. However, the very small elementary particle size means that few pores are contained within any one particle, thereby theoretically producing lower specific activities.

There is a need for new methods of preparation of new materials of these types, cost reductions, ease of recoverability and environmental compatibility in the template and inorganic precursors has lead to the development of a new synthetic method to be described herein.

OBJECTS OF THE INVENTION

It is therefore an object of the present invention to provide a new approach to the design and synthesis of crystalline inorganic oxide compositions with a disordered assembly of worm-like channels. Further, it is an object of the present invention to provide inexpensive templates, precursors and methods while avoiding high energy demanding and costly hydrothermal syntheses. Further, it is an object of the present invention to provide a template system that allows for facile recovery and thereby recycling of the template from the condensed inorganic structure via solvent extraction. Further, it is an object of the present invention to provide a template system that affords inorganic oxide compositions through lower cost, lower toxicity than either quaternary ammonium or amine surfactants and template biodegradability. Finally, it is an object of the present invention to provide for the preparation of well defined non-layered mesoporous structures of oxide materials derived from metals other than silicon, that are not accessible through the prior art. These and other objects will become increasingly apparent by reference to the following description and the drawings.

DESCRIPTION OF PREFERRED EMBODIMENTS

Figure 1A:
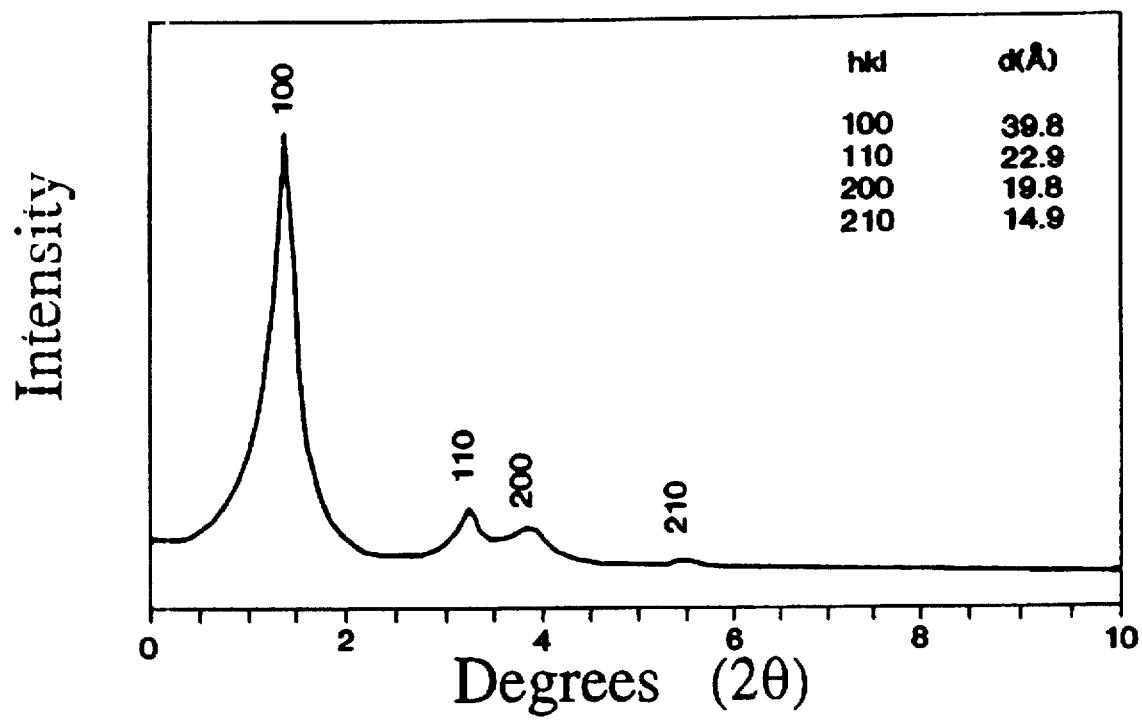
FIGS. 1A and 1B are graphs showing representative X-ray powder diffraction patterns of MCM-41 (FIG. 1A) Beck et al., *J. Am. Chem. Soc.*, Vol. 114, 10834–10843, (1992) and HMS (FIG. 1B) Pinnavaia et al. (*Science*, Vol. 267, 865–867, (1995) products.
Figure 1B:
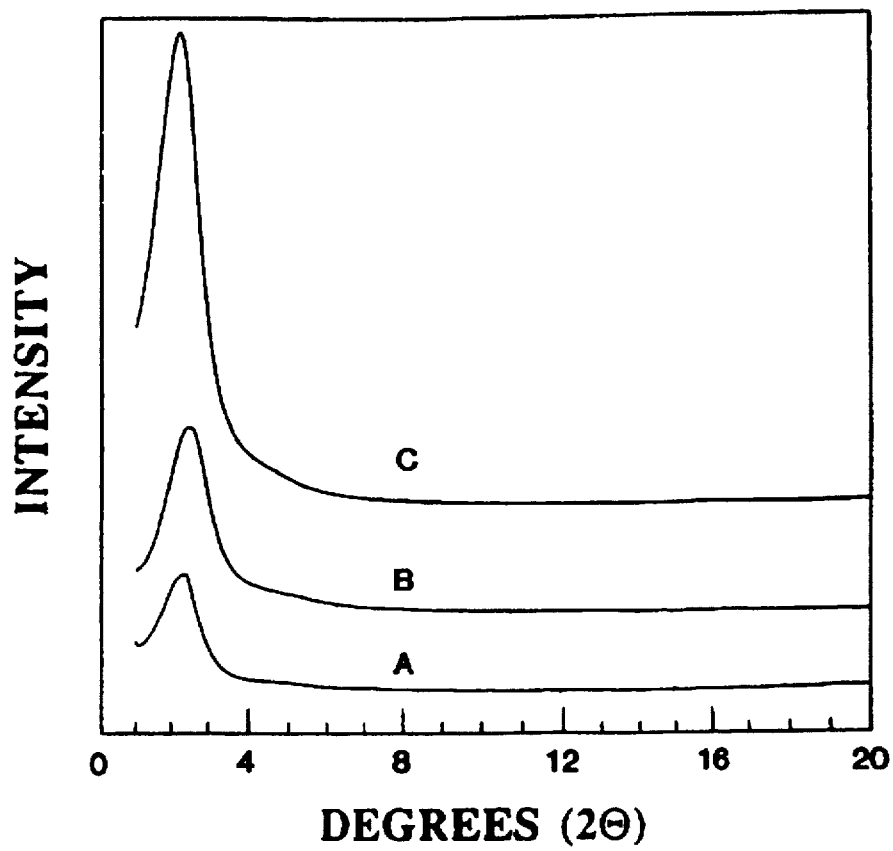
Figure 2A:
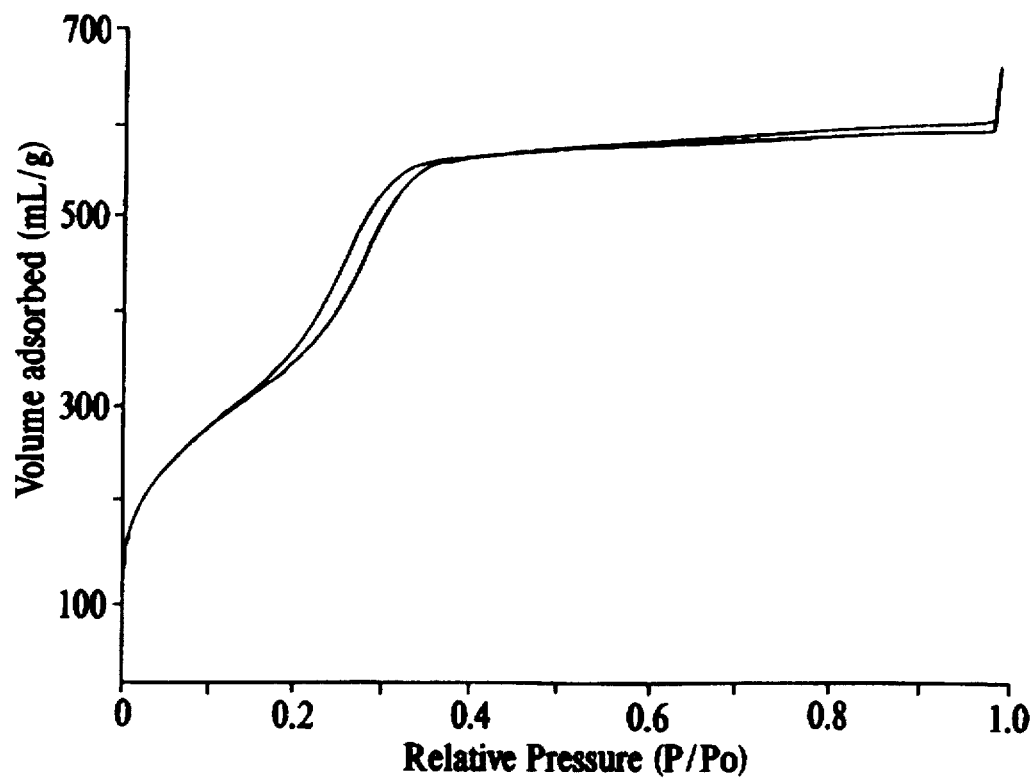
FIGS. 2A and 2B are graphs showing representative $N_2$ adsorption-desorption isotherm for MCM-41 (FIG. 2A) Beck et al., *J. Am. Chem. Soc.*, Vol. 114, 10834–10843, (1992) and HMS (FIG. 2B) Pinnavaia et al. (*Science*, Vol. 267, 865–867, (1995) products.
Figure 2B:
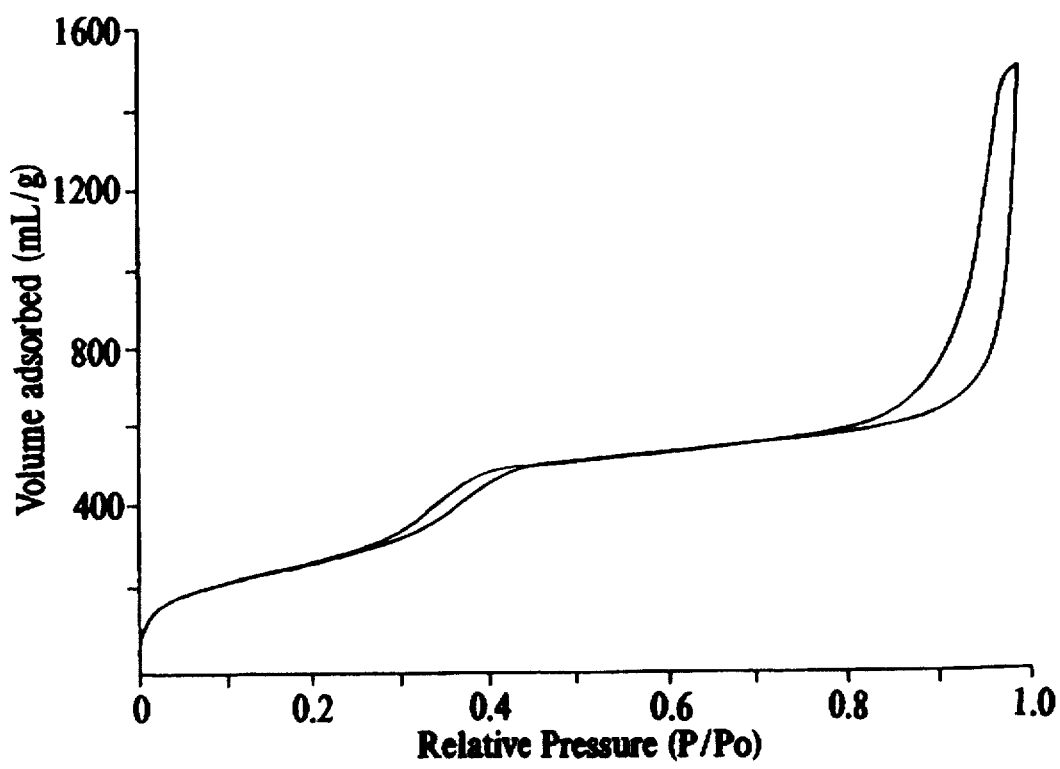

The present invention relates to a synthetic, semi-crystalline inorganic oxide composition having at least one resolved x-ray reflection corresponding to a lattice spacing of 3 to 10 nm, framework confined channels between about 2 and 10 nm diameter, and a specific surface area of 300 to 1400 square meters per gram and having a disordered assembly of worm-like channels.

The present invention also relates to a method for the preparation of a synthetic semi-crystalline inorganic oxide composition which comprises: providing a mixture of (i) a neutral inorganic oxide precursor (I°) containing at least one element selected from the group consisting of di-, tri-, tetra-, penta- and hexavalent elements and mixture thereof; (ii) a non-ionic poly(alkylene oxide) surfactant (S°) as a template; and (iii) a hydrolyzing agent; mixing the solution to form a gelcontaining the composition; separating at least some of the hydrolyzing agent and the surfactant to form the composition; and optionally calcining the composition wherein the composition has a disordered assembly of worm-like channels.

The present invention further relates to a method for the preparation of a synthetic, semi-crystalline inorganic oxide composition which comprises: preparing a solution of a neutral inorganic oxide precursor (I°), containing at least one element selected from the group consisting of di-, tri-, tetra-, penta- and hexavalent elements and mixtures thereof with stirring and optionally aging the inorganic oxide precursor (I°) solution; preparing a homogeneous solution of a non-ionic poly(alkylene oxide) surfactant (S°) as a template in a hydrolyzing agent, and optionally in a co-solvent, by stirring it at a temperature between about minus 200° and plus 100° C.; mixing of the solutions of steps (a) and (b) at a temperature between about minus 20° and plus 100° C. to form a gel which is aged for at least about 30 minutes to form the composition; separating at least some of the hydrolyzing agent and surfactant from the composition; and optionally calcining the composition, wherein the composition has a disordered assembly of worm-like channels.

The present invention further relates to a method for the preparation of a crystalline inorganic oxide composition which comprises: preparing a homogeneous solution of nonionic poly(ethylene oxide) surfactant as a template (N°) in a lower alkyl alcohol solvent by mixing at ambient temperature; adding an inorganic metal precursor to the solution of step (a) at ambient temperature under stirring for at least 30 minutes to form a homogeneous solution; slowly adding a solution of a hydrolyzing agent to the homogeneous solution to form a gel as a first precipitate in the aqueous solution; aging of the first precipitate with stirring; redispersion of the first precipitate in a lower alkyl alcohol; aging the redispersion under stirring at ambient temperature for 16 to 48 hours to form a second precipitate; separating the aqueous solution, lower alkanol and at least some of the template from the second precipitate by washing once with ethanol; drying the second precipitate in air at ambient temperature to form the composition; optionally heat treating the second precipitate to at least 373° K in air for at least 16 hours; optionally removing the template by solvent extraction; and optionally calcining the second precipitate to remove any remaining of the template and to cross-link the framework at between about 673° K and 973° K in air for at least 4 hours, wherein the composition has a disordered assembly of worm-like channels.

The present invention further relates to a method for the preparation of synthetic, semi-crystalline inorganic silicon dioxide composition which comprises: preparing a homogeneous aqueous solution of a nonionic poly(ethylene oxide) derived surfactant template (N°) with mixing at ambient temperature; adding an inorganic silica precursor to the solution of step (a) at ambient temperature with stirring to form a solid, precipitate; aging of the precipitate with stirring at ambient temperature for between 16 and 48 hours; separating the aqueous solution and template from the precipitate followed by washing once with deionized water; drying the precipitated and separated precipitate in air at ambient temperature; heat treating the air dried precipitate in air at least 373 ° K for at least 16 hours; optionally removing any remaining template by solvent extraction from the heat treated precipitate; and calcining the precipitate to remove any remaining template to cross-link the framework at between 673° K and 973° K in air for at least 4 hours to form the composition, wherein the composition has a disordered assembly of worm-like channels.

The present invention provides to a new route to the synthesis of semi-crystalline materials with a disordered assembly of worm-like channels. The compositions produced in the current invention are distinguished from those of the prior art by the virtue of the method of preparation of the present invention, the subsequent architecture of the mesoporous structure and the range of templated metal oxides other than silica that is afforded by this route. Formation of the mesoporous network is accomplished by interaction (complexation and/or hydrogen-bonding)

between a nonionic polyethylene oxide based surfactant template and neutral inorganic precursors, followed by hydrolysis and subsequent condensation of the inorganic reaction product under either ambient or elevated temperature reaction conditions and the subsequent removal of the solvent phase and the template.

The present invention particularly provides a preferred totally nonionic (N° I°) route to the preparation of quasi-crystalline oxide compositions comprising (a) preparing a homogeneous solution or emulsion of a nonionic polyethylene oxide-based surfactant (N°) by stirring, sonicating or shaking at standard temperature and pressure (STP); (b) addition of one or more neutral inorganic precursors with stirring at standard temperatures and pressures (STP) to the emulsion of step (a) at ambient temperature to form a precipitated semi-crystalline product; (c) separating the solvent and the hydrolyzing agent from the precipitated product by filtration or centrifugation; (d) optionally calcining the quasi-crystalline product at 673° K to 873° K for at least 4 hours in air or (e) extracting the template through solvent extraction whereby the solvent is either water or ethanol.

The present invention thus provides a new route to inorganic oxide crystalline materials with a disordered assembly of worm-like channels that can be utilized as adsorbents, catalysts and catalyst supports for the catalytic conversion of organic substrates. The present invention is distinguished from the prior art by the new preparative N° I° method used to obtain the mesoporous crystalline inorganic oxide materials, the pore morphology of the said materials and the range of templated mesoporous metal oxide materials that may be prepared by this method. According to the method of the present invention, the formation of the mesoporous structure is accomplished by interaction (complexation and/or hydrogen bonding) between template molecules within micellar aggregates of nonionic polyethylene oxide-based templates and neutral inorganic oxide precursors, followed by hydrolysis and cross linking of $IO_x$ units, where I is a central metallic or non-metallic element coordinated to x oxygen atoms ($2 \leq x \leq 6$). This interaction is most likely to occur between an I-OH unit and the terminal OH function of each surfactant molecule, or between the I-OH unit and the array of lone pair electrons on the template polar segment. The polar segment of the template in the present invention is flexible and appears to act in the fashion of a crown ether complexing a I-OH unit, thereby stabilizing a site of nucleation for subsequent condensation of the mesoporous quasi-crystalline inorganic oxide product, although the inventors do not want to be bound to any particular theory.

The inventors know of no prior art teaching the preparation of micro-, meso-, or macro-porous inorganic oxide compositions by such a nonionic N° I° mechanism involving crystallization of inorganic oxide precursors around well defined micelles of nonionic surfactants. Specifically, the present result is achieved by using micelles of a nonionic surfactant to template and assemble a neutral inorganic reactant precursor into a mesoporous framework structure. Complexation and/or hydrogen bonding between the template and the reagent is believed to be the primary driving force of the assembly of the framework in the current invention. The aforementioned method consists of the formation of a solid precipitate by the mixing of a solution or emulsion of a polyethylene oxide-based nonionic surfactant, with a neutral inorganic oxide precursor. The latter being an inorganic alkoxide, in the presence of a hydrolyzing agent, followed by aging and crystallization under stirring, sonication or shaking at ambient temperature for at least 16 h.

The template may be recovered by extraction with ambient temperature alcohol or hot water whose temperature exceeds the cloud point of the template. Complete removal of the remainder of the template and final crosslinking of the $IO_x$ framework is accomplished by calcination in air at temperatures between 673° K and 973° K for at least 4 h.

The molar ratio of inorganic oxide precursor to surfactant is preferably between 10:1 and 20:1 depending upon the specific template being used. The concentration of surfactant in solution is between 0.003 mol L$^{-1}$ and 0.4 mol L$^{-1}$ again depending upon the surfactant being used and the pore size desired.

The crystalline inorganic oxide composition of the present invention in its calcined state has the formula:

nR-EO/A$_v$G$_w$C$_x$D$_y$O$_z$ wherein A$_v$G$_w$C$_x$D$_y$O$_z$ is written in anhydrous form, wherein R-EO is at least one of a selection of nonionic alkyl, or alkyl/aryl polyethylene oxide or polyethylene oxide-polypropylene oxide-polyethylene oxide block co-polymer molecules wherein when R-EO is present n is between about 0.01 and 1; A is at least one optional trivalent element selected from the group consisting of B, Cr, Al, Ga and Fe; G is at least one optional tetravalent metallic element selected from the group consisting of Ge, Ti, V, Hf and Zr; Si is silicon; D is an optional and is a pentavalent or hexavalent element selection from the group consisting of Sb, Cr, Nb, Ta, V, W and Mo; O is oxygen and v, w, X, y and z are the molar stoichiometries of A, G, Si, D and O respectively, wherein in the composition when calcined, n is about 0, $0.0015 \leq V \leq 2$, $0.001 \leq W \leq 1$, $0.001 \leq X \leq 1$, $0.001 \leq Y \leq 2$ and $1 \leq Z \leq 3$.

The comosition can have the formula nR-EO/A$_x$O$_y$, wherein A$_x$O$_y$ is written in anyhydrous form, wherein R-EO is selected from the group consisting of nonionic alkyl polyethylene oxide, alkyl and aryl polyethylene oxide, and polyethylene oxide-polypropylene oxide-polyethylene oxide block co-polymer molecules; and wherein when R-EO is present, n is between about 0.01 and 1; A is a metal atom; O is oxygen and x and y are the molar stoichiometries of A and O, such that in the composition when calcined, n is about O, x is about 1 and y is between about 1 and 3.

The semi-crystalline mesoporous materials of the present invention may be described as being formed by hydrogen-bonding between the terminal hydroxyl function or the array of lone pair electrons on the O atoms of the ethylene oxide units of the template molecules and any M-(OR)$_x$ compound. This H-bonding is followed by hydrolysis and subsequent condensation and cross-linking of $IO_x$ units under ambient or elevated temperature reaction conditions. Specifically, the said method comprises the formation of an organic/inorganic solution by the mixing of an aqueous or alcoholic solution of nonionic surfactant with the desired amount of Si-alkoxide, M-Si double alkoxide, mixtures of Si-and M-alkoxides or pure M-alkoxides (where M=Al, Ca, Cr, Fe, Ga, Ge, Mg, Mo, Nb, Sb, Sn, Ti, V, W, or Zr), followed by aging and subsequent precipitation under stirring for at least 16 h.

The composition of this invention is characterized by at least one strong XRD peak at a basal spacing (d$_{100}$) of at least 3.0 nm or larger. (The designation d$_{100}$ is arbitrary and not intended to imply any long range hexagonal, cubic or lamellar order for the compositions.) The compositions are also distinguished in part from those of the prior art, specifically MCM-41 materials, by the assembly of worm-like channels.

In the present invention, the template may be removed from the condensed reaction products in at least three different ways: (i) air drying followed by calcination in air or in inert gas preferably at a temperature from 673° K to 973° K for 4 to 6 h; (ii) solvent extraction of the template from the air dried material using alcohol or hot water; (iii) combination of (i) and (ii).

Procedure (i) results in the complete oxidation and thereby decomposition of the occluded template. The current invention improves on the environmental impact of the prior material preparation art, as the oxidation products of quaternary ammonium and amine based surfactant templates described in the prior art, include environmentally undesirable $NO_x$ gases, while the oxidation products of polyethylene oxide based surfactants are the more environmentally compatible $H_2O$ and $CO_2$ gasses. Procedure (ii) allows the template to be recovered and subsequently recycled and reused. If the template is removed by procedure (ii), the product should be calcined in air or inert gas to remove the final traces of the template and to complete the cross linking of the mesostructure.

After calcination, the present compositions may be used as adsorbents, molecular sieves, catalysts and catalyst supports. When the calcined product is appropriately substituted or subsequently impregnated as taught in Ger. Pat. (DD) No. 286,522, with the correct amount of a catalytically active element, such as Al, Rh, Nb, Re, Ag, Cu, Cr, Pt, Pd, Ti, V, Zr or mixtures thereof, or when intercalated with transition metal inorganic metallocycles, it can be used as a catalyst for cracking, hydrocracking, hydrogenation-dehydrogenation, isomerization or oxidations involving large and small organic substrates.

The new synthesis method of the compositions of this invention involves the preparation of solutions or emulsions of a surfactant template compound and reaction of this solution with liquid di-, tri-, tetra-, penta- or hexa-valent metal or metalloid hydrolyzable reagents in the presence of a hydrolysing agent under stirring, sonication or shaking, until formation of the desired precipitated product is achieved and recovering the solid material. The template is described more particularly as a nonionic (neutral) polyethylene oxide based molecule that would possess one of many different molecular structures and the hydrolysing agent is described as water.

Figure 9:
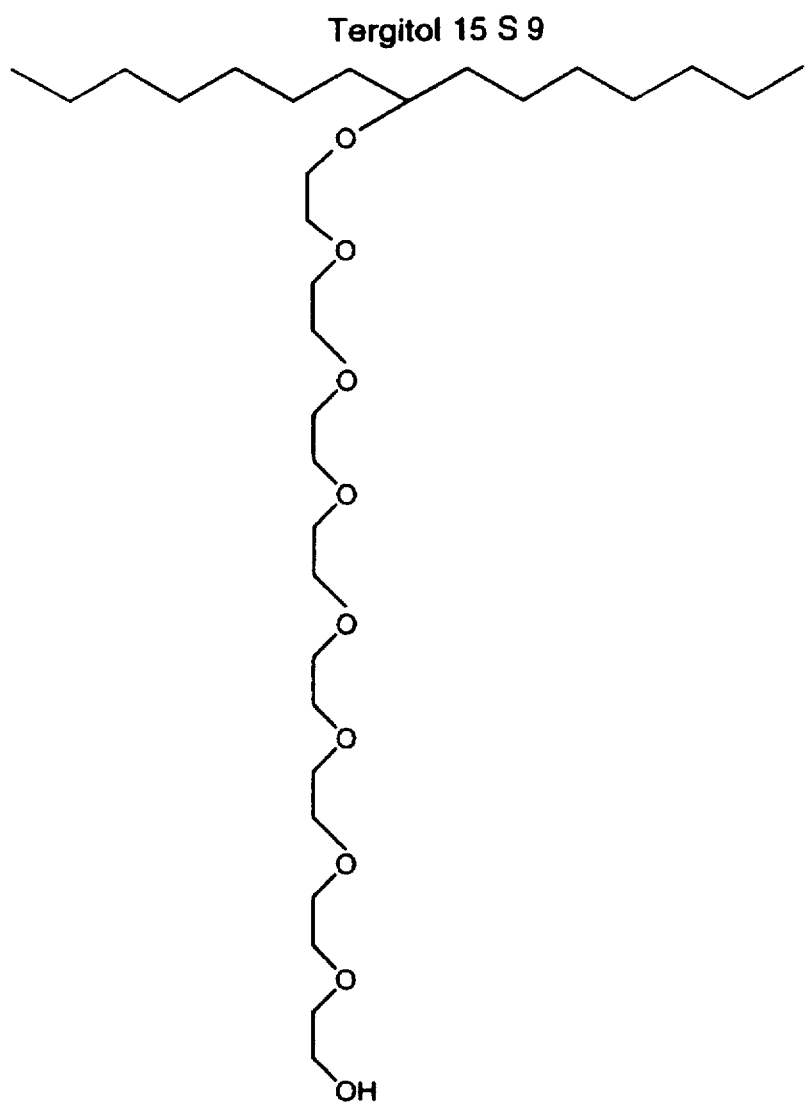
FIG. 9 is a representative chemical structure of a secondary fatty alcohol poly-ethoxylate (Tergitol™).

There are four basic types of surfactant molecules that are described herein. The alkyl-polyethylene oxides; such as are related to the TERGITOL 15-S-m products (FIG. 9) are derived from the reaction of ethylene oxide with a primary or secondary alcohol and possess the basic formula $R_n$—O$(EO)_m$H where R is a hydrophobic alkyl group with n ranging from 1 to at least 20 carbon atoms, EO is a hydrophilic ethylene oxide unit ($OCH_2CH_2$) with m ranging from about 7 to 40, preferably at least 20.

Figure 10A:
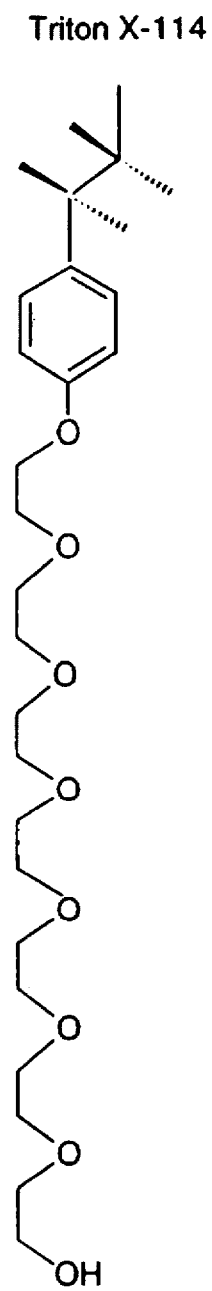
FIG. 10A is a representative chemical structure of an alkyl phenol poly-ethoxylate (TRIton X™).
Figure 10B:
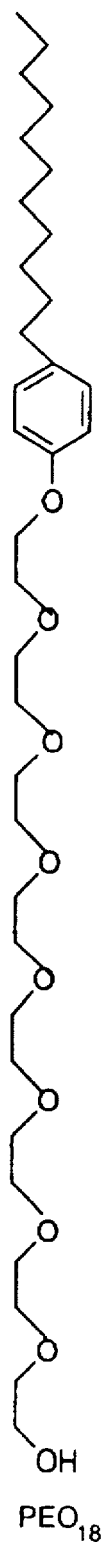
FIG. 10B is Igepal RC-760.
Figure 11:
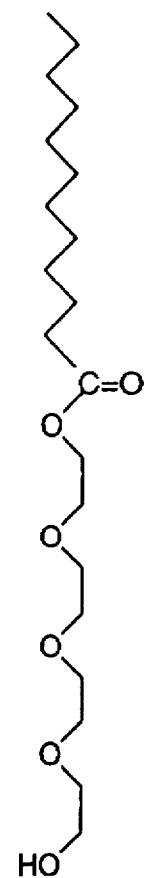
FIG. 11 is a representative chemical structure of a fatty acid ethoxylate.

The alkyl-phenyl polyethylene oxides; such as IGEPAL-RC (FIG. 10B) and TRITON-X (FIG. 10A), possess the same range of structures as the alkyl-polyethylene oxides, with the exception that the primary (IGEPAL RC), secondary or tertiary (TRITON X) R group is bound to the EO units through a hydrophobic phenoxy group (PhO). These molecules then, have the basic formula; $R_n$—Ph—O$(EO)_m$H, preferably where m is 8 to 10 and n is 8.

Figure 12:
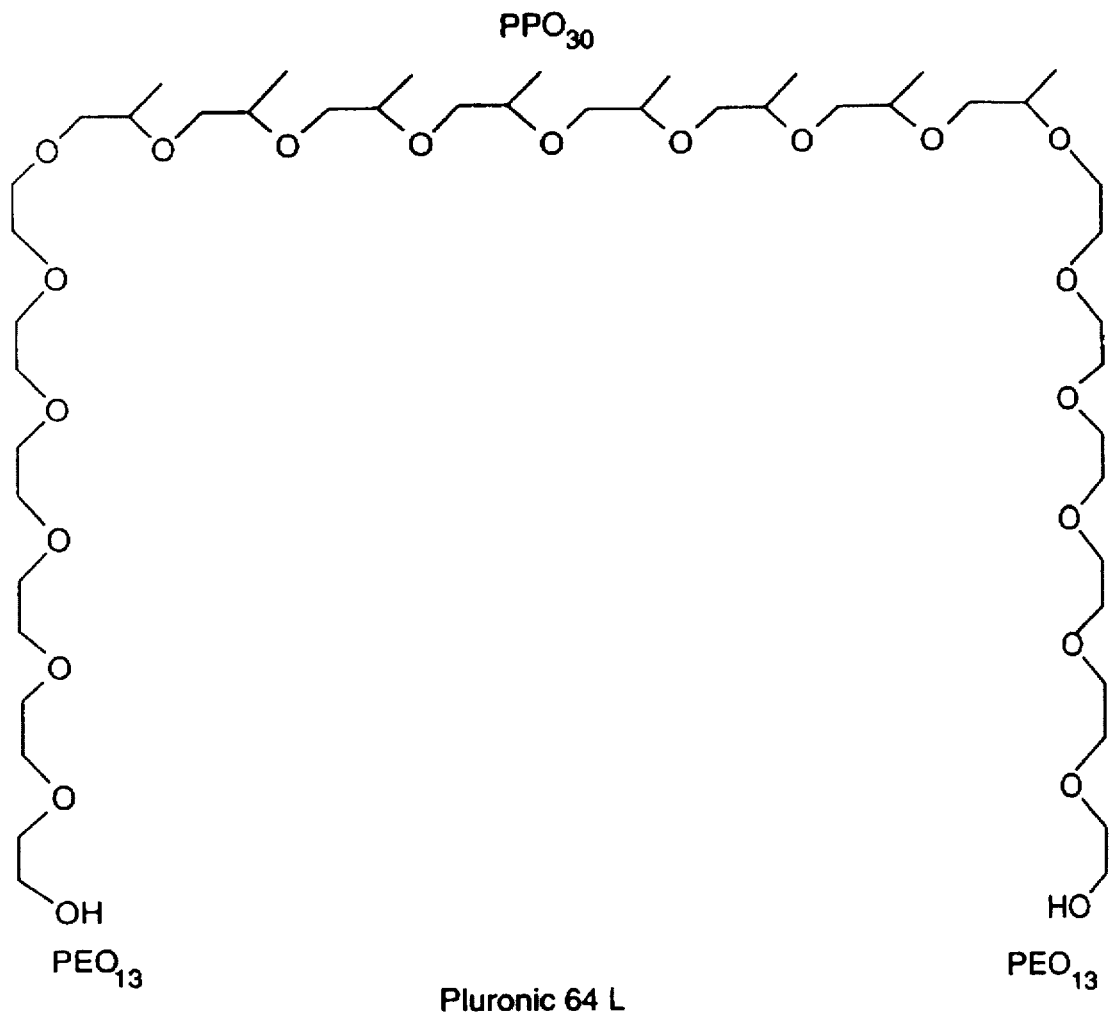
FIG. 12 is a representative chemical structure of an ethylene oxide-propylene oxide-ethylene oxide tri-block co-polymer (PLURONIC 64L™).

The polyethylene oxide (PEO)-polypropylene oxide (PPO) molecules; such as PLURONIC (FIG. 12), are derived from the addition of hydrophobic propylene oxide to propylene glycol followed by the addition of hydrophilic ethylene oxide. They are defined as $PEO_n$-$PPO_m$-$PEO_n$ tri-block co-polymers wherein n is controlled by length to constitute from 10% to 80% by weight of the final product. The order of the PEO and PPO units may be reversed in order to produce the $PPO_m$-$PEO_n$-$PPO_m$ triblock co-polymers; PLURONIC-R. Preferably n is 30 and m is 13.

Figure 13:
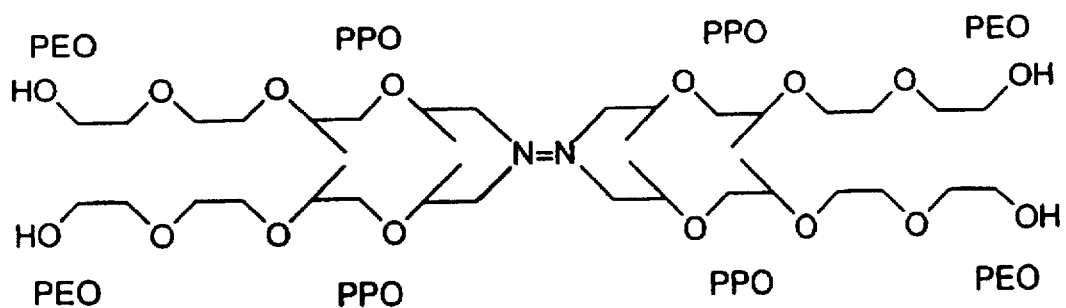
FIG. 13 is a representative chemical structure of the ethylene diamine propylene oxide-ethylene oxide derivative (TETRONIC™).
Figures 14, 15:
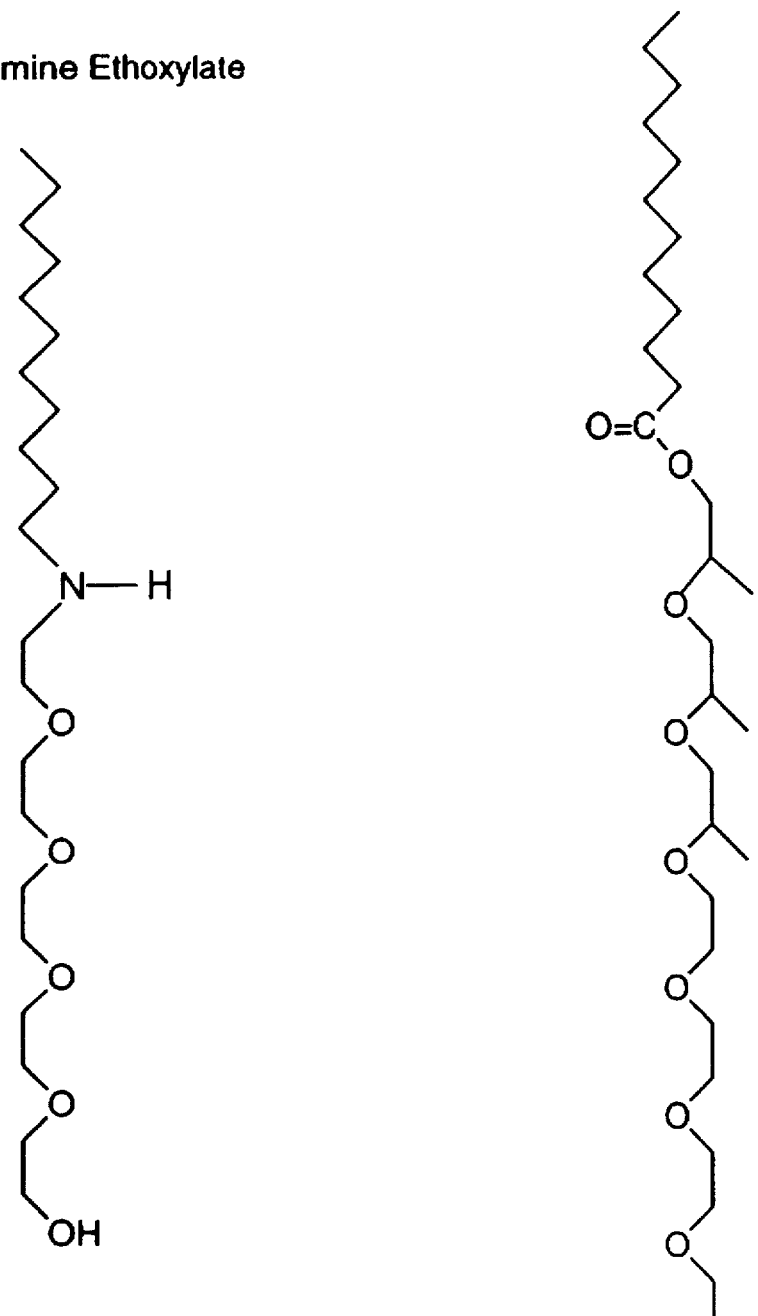
FIG. 14 is a representative chemical structure of a primary fatty amine poly-ethoxylate.
FIG. 15 is a representative chemical structure of a fatty acid PPO/PEO block co-polymer.
Figure 16:
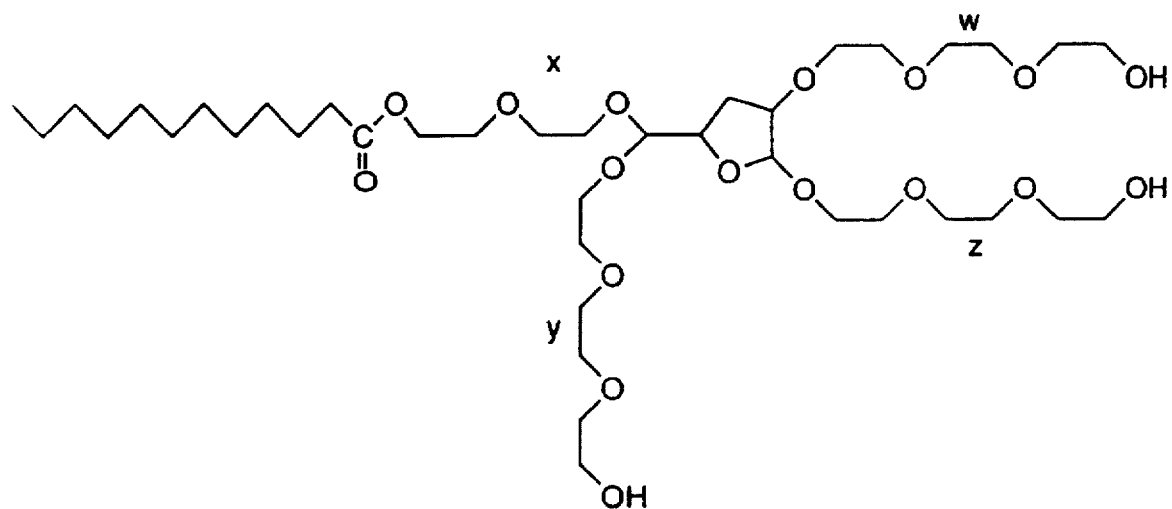
FIG. 16 is a representative chemical structure of a sorbitan ethoxylate.

A fourth basic PEO based surfactant type is derived by from the substitution of the hydrogens of ethylene diamine by ethylene oxide and propylene oxide units to form the X shaped, TETRONIC, molecules (FIG. 13) with basic formula: $((EO)_n\text{-}(PO)_m)_2$—$NCH_2CH_2N$-$((PO)_m\text{-}(EO)_n)_2$. The order of the PEO and PPO groups in these molecules may also be reversed to form TETRONIC-R. Preferably m is 13 and n is 30.

The preferred preparation procedures of the said compositions comprise steps as follows:

(i) preparing a solution of the desired template under stirring, in a solvent that is either, water for the preparation of silicon dioxide, or alcohol for the preparation of metal oxide compositions from more reactive alkoxide precursors;

(ii) addition of the desired metal oxide precursor to the surfactant solution under stirring, sonication or shaking;

(iii) preparation of a solution of the hydrolysing agent in the alcohol used in step (i). The hydrolysing agent is water;

(iv) very slow addition of the hydrolysing agent to the template/inorganic precursor solution under stirring. (iii and iv are not required if templated silica is being prepared);

(v) aging of the total solution for at least 16 h up to 48 h at room temperature;

(vi) separation of the product from the supernatant liquid by filtration or centrifugation;

(vii) air drying of the product followed by heat treatment at 373° K;

(viii) separation of the template by extraction with either ethanol or hot water or a mixture thereof; and (ix) calcination of the templated product in air or inert gas at between 473° K and 973° K for 0.5 h for extracted compositions or for 4 to 6 h for unextracted products.

The inorganic oxide precursors are single or double metal alkoxide compounds. The list of preferred alkoxides includes but not exclusively: aluminum(III) ethoxide, aluminum(III) isopropoxide, aluminum(III) n-, sec- or tert-butoxide, antimony(III) isopropoxide, antimony(III) n-butoxide, calcium(II) ethoxide, calcium(II) isopropoxide, calcium(II) tert- butoxide, chromium(IV) isopropoxide, chromium(IV) tert- butoxide, copper(II) methoxyethoxide, gallium(III) isopropoxide, germanium(IV) ethoxide, germanium(IV) isopropoxide, indium(III) isopropoxide, iron(III) ethoxide, iron(III) isopropoxide, iron(III) tert-butoxide, lead(II) isopropoxide, lead(II) tert- butoxide, magnesium(II) ethoxide, manganese (II) isopropoxide, molybdenum(V) isopropoxide, niobium(V) ethoxide, silicon(IV) methoxide, silicon(IV) ethoxide, silicon(IV) propoxide, silicon(IV) butoxide, silicon(IV) hexoxide, strontium(II) ethoxide, tin(IV) isopropoxide, titanium(IV) ethoxide, titanium(IV) propoxide, titanium(IV) isopropoxide, titanium(IV) butoxide, titanium(IV) octadecoxide, tungsten(VI) ethoxide, tungsten (VI) isopropoxide, vanadium(V) triisopropoxide oxide, zinc(II) isopropoxide, zinc(II) tert- butoxide, zirconium(IV) n-propoxide, zirconium(IV) isopropoxide, zirconium(IV) butoxide, zirconium(IV) tert- butoxide, aluminum(III) silicon(IV) alkoxide, titanium(IV) silicon(IV) polyethoxide and other mixtures of the aforementioned alkoxide compounds. The alcohols used in step (i) of the preparation art correspond to the alcoholate ligand from which the metal alkoxide is derived. The alcohols thus preferred are methanol, ethanol, n- and isopropanol and n-, sec-, tert-, butanol. The alcohols contain 1 to 4 carbon atoms.

Said mixed metal alkoxides are obtained through proprietary preparations or by reaction of desired metal alkoxides in desired molar ratios under reflux (433° K) for 3–4 h.

The said reacting of the inorganic precursor and the template solution is achieved at room temperature (298° K to 303° K) under stirring for at least 16 h.

Aging of the reaction mixture may be achieved at room temperature either under stirring, sonication or shaking or by being left to stand for at least 24 h. More specifically, the reacting occurs through complexation or H-bonding between a neutral nonionic template and neutral inorganic oxide precursors, followed by hydrolysis and crosslinking of $IO_X$ units at ambient or elevated reaction temperatures. The complexation, or H-bonding most likely occurs between the terminal OH group of the template molecules and the hydrolyzable ligand on the inorganic precursor molecule, or between the inorganic precursor molecule and the electron lone pairs of the ethylene oxide groups in the hydrophilic head group of the template molecules.

The calcination is performed in a temperature controlled oven by heating in air at a rate of 2° K min$^{-1}$ to a final temperature between 673° K and 973° K for at least 30 min, preferably 4 to 6 h.

The outstanding features of the present invention are:

(i) The use of nonionic (N°) polyethylene oxide based templates, to assemble mesoporous metal oxide framework compositions with a worm-like array of channels of regular diameter in the mesopore size range;

(ii) The use of neutral metal alkoxide inorganic oxide precursors (I°);

(iii) The reaction of solutions of inorganic oxide precursors under reflux for 3–4 h in order to obtain polymerized I-O-I' species;

(iv) The use of hydrogen bonding or non-electrostatic complexation as the driving force for the neutral N° I° assembly of the nonionic template and the neutral inorganic oxide precursor species;

(v) The use of ambient reaction conditions to prepare the templated product;

(vi) The recovery and recycling of the template through simple solvent extraction from the product.

(vii) The use of low cost, non-toxic, biodegradable and low energy requirement preparation art.

The templated inorganic oxide compositions of the present invention can be combined with other components, for example, zeolites, clays, inorganic oxides or organic polymers or mixtures thereof. In this way adsorbents, ion-exchangers, catalysts, catalyst supports or composite materials with a wide variety of properties may be prepared. Additionally, one skilled in the art may impregnate or encapsulate transition metal macrocyclic molecules such as porphyrins or phthalocyanines containing a wide variety of catalytically active metal centers.

Additionally, the surfaces of the compositions can be functionalized in order to produce catalytic, hydrophilic or hydrophobic surfaces. This functionalization can be introduced during the synthesis procedure by replacing the metal alkoxide precursor with alkyl metal alkoxide $[MR(OR)_{x-1}]$ reactants, or metal carboxylate reactants. The surfaces may be functionalized after synthesis by reaction with various chlorides, fluorides, sylisation or alkylating reagents.

The following are specific examples of the present invention intended to illustrate but not to limit the invention.

EXAMPLES 1–6

The desired amount of one of a range of TERGITOL 15-S templates, with varying hydrophilic head group lengths, was dissolved in one hundred milliliters of deionized $H_2O$ under stirring at room temperature, until a homogeneous solution was obtained. The appropriate quantity of $Si(OC_2H_5)_4$ was added at once to the above template solution under stirring at room temperature. The reaction stoichiometry expressed in terms of moles per mole Si correspond to the following:

0.1 mol $R_n$—$(OCH_2CH_2)_m$OH 50 mol $H_2O$

The resulting solution was stirred and aged for 16 h at room temperature. During the initial 1–3 h stirring, white templated products were observed as solid precipitates. The products were separated from the mother liquor through filtration or centrifugation and dried at room temperature. The template was then removed through calcination in air at 973° K for 4 h.

The X-ray powder diffraction (XRD) patterns of all the samples were obtained with a RIGAKU ROTAFLEX (Japan) diffractometer equipped with a rotating anode and $CU_{K\alpha}$ radiation (l=0.15148 nm). The diffraction data were recorded by step scanning at 0.02 degrees of 2 theta, where theta is the Bragg angle and photon counting time of 1 sec step$^{-1}$. The d-spacings of the X-ray reflections of the samples were calculated in nm. Transmission electron micrographs were obtained on a JEOL JEM 100CX II (Japan) electron microscope by observing unmodified particles supported on carbon coated copper grids (400 mesh). The sample images were obtained using an accelerating voltage of 120 kV, a beam diameter of approximately 5 mm and an objective lens aperture of 20 mm. The pore structures of said compositions were characterized by measuring $N_2$ adsorption-desorption isotherms using a Coulter 360CX (Florida) sorptometer. Isotherms were recorded at 70° K using a standard continuous sorption procedure. Before measurement, each sample was outgassed overnight at 323° K and 10$^{-6}$ Torr. The specific surface area ($S_{BET}$, m$^2$ g$^{-1}$) and the total pore volumes ($V_t$, mL g$^{-1}$), which were consistent with mesoporous structures, were calculated from the adsorption isotherms following IUPAC recommendations (Sing et al., Pure Appl. Chem., 57, 603–619 (1985)). The pore size distributions of the compositions were calculated following the method of Horvath and Kawazoe (G. Horvath and K. J. Kawazoe, J. Chem. Eng. Jpn., 16, 470–475 (1983)). Thermogravimetric analyses of the samples were performed under a flow of dry $N_2$ gas on a CAHN system thermogravimetric gas (TG) analyzer using a heating rate of 5° K min$^{-1}$. The amounts of each surfactant used in the examples 1–6, together with the corresponding physicochemical parameters are summarized in Table 1.

TABLE 1

| Example | Template formula | Amount of template used. (g) | $d_{100}$ (nm) | HK pore diameter (nm) | BET Surface area (m$^2$g$^{-1}$) |
|---|---|---|---|---|---|
| 1 | Tergitol 15-S-7 | 5.15 | 4.4 | 2.2 | 900 |
| 2 | Tergitol 15-S-9 | 5.84 | 5.2 | 2.5 | 1010 |

TABLE 1-continued

| Example | Template formula | Amount of template used. (g) | $d_{100}$ (nm) | HK pore diameter (nm) | BET Surface area ($m^2g^{-1}$) |
|---|---|---|---|---|---|
| 3 | Tergitol 15-S-15 | 7.38 | 4.1 | 3.1 | 1005 |
| 4 | Tergitol 15-S-15 | 8.77 | 5.4 | 2.6 | 640 |
| 5 | Tergitol 15-S-20 | 10.79 | 7.8 | 4.8 | 605 |
| 6 | Tergitol 15-S-30 | 15.58 | 7.9 | 4.5 | 525 |

*The Material designation is MSU-1.

EXAMPLES 7-11

In Examples 7 to 9 the concentration of the template in aqueous solution was varied in order to modify the effective channel size distribution. This teaching is not apparent in synthetic strategies of the prior art (U.S. Pat. Nos. 5,098,684, 5,102,643 and 5,057,296).

To 100 milliliters of deionized water was added 1%, 5%, 10% 15% and 25% by weight of surfactant per weight of solvent under stirring at room temperature. To these solutions was added the appropriate amount of $Si(OC_2H_5)_4$ so that the Si:surfactant molar ratio was 10:1. The relative reaction stoichiometry with respect to Si and surfactant remained constant for each example, while the reaction stoichiometry of water per mole of Si changed with each preparation. The reaction stoichiometries corresponded to the following:

Example 7:
0.1 mol $R_n$—$(OCH_2CH_2)_{15}OH$
492 mol $H_2O$.
Example 9:
0.1 mol $R_n$—$(OCH_2CH_2)_{15}OH$
33 mol $H_2O$.
Example 11:
0.1 mol $R_n$—$(OCH_2CH_2)_{15}OH$
20 mol $H_2O$.

Example 8:
0.1 mol $R_n$—$(OCH_2CH_2)_{15}OH$
98 mol $H_2O$.
Example 10:
0.1 mol $R_n$—$(OCH_2CH_2)_{15}OH$
29 mol $H_2O$.

The resulting precipitate was aged under stirring at room temperature for 16 h to obtain the templated product. The product was then transferred into sealed containers and heated at 373° K for a further 16 h. The crystalline product was then filtered, dried at room temperature and calcined at 973° K for 4 h to remove the occluded template. The physico-chemical properties of the calcined templated products are described in Table 2.

TABLE 2

| Example | Template formula | Amount of template used (g) | $d_{100}$ (nm) | HK pore diameter (nm) | BET Surface area ($m^2g^{-1}$) |
|---|---|---|---|---|---|
| 7 | Tergitol 15-S-15 | 1.0 | 4.3 | 2.0 | 655 |
| 8 | Tergitol 15-S-15 | 5.0 | 3.6 | 2.0 | 465 |
| 9 | Tergitol 15-S-15 | 10.0 | 3.9 | 2.0 | 515 |
| 10 | Tergitol 15-S-15 | 15.0 | 4.0 | 2.2 | 890 |

TABLE 2-continued

| Example | Template formula | Amount of template used (g) | $d_{100}$ (nm) | HK pore diameter (nm) | BET Surface area ($m^2g^{-1}$) |
|---|---|---|---|---|---|
| 11 | Tergitol 15-S-15 | 25.0 | 5.5 | 2.5 | 700 |

*The Material designation is MSU-1.

EXAMPLES 12 and 13

The following examples were prepared to confirm the ability of alkyl-phenyl polyethylene oxide surfactants to act as templating agents for mesostructure formation in the manner of the present invention.

Aqueous solutions of TRITON-X 100 and TRITON-X (FIG. 10A) 114 were prepared as in the manner of the preparation art of Examples 1 through 11. The concentration of template was 7.50% weight of surfactant per weight of solvent. $Si(OC_2H_5)_4$ was added at once in the appropriate amount so that the Si:surfactant molar ratio was 10:1 as in the preparation art of Examples 1 through 11. The remainder of the synthesis was identical to the preparation art described in Examples 1 through 6. The calcined templated products exhibited XRD patterns, BET surface areas, HK pore size distributions and pore wall thicknesses as described in Table 3.

TABLE 3

| Example | Template formula | Amount of template used. (g) | $d_{100}$ (nm) | HK pore diameter (nm) | BET Surface area ($m^2g^{-1}$) |
|---|---|---|---|---|---|
| 12 | $C_8Ph(EO)_8$ | 2.3 | 6.1 | 2.0 | 780 |
| 13 | $C_8Ph(EO)_{10}$ | 2.7 | 6.2 | 3.5 | 715 |

*The Material designation is MSU-2.

EXAMPLES 14-16

Examples of the present preparation art are presented for compositions prepared by templating with various concentrations of the nonionic surfactant PLURONIC 64L. This surfactant differs from those discussed in the prior examples in that the hydrophobic part of the surfactant molecule is based on propylene oxide units. The molecule is defined as a polyethylene oxide-polypropylene oxide- polyethylene oxide tri-block co-polymer.

Aqueous solutions of PLURONIC 64L (FIG. 12) with concentrations of 50%, 10% and 15% weight of surfactant per weight of solvent were prepared as in the preparation art of the previous examples 1 through 13. $Si(OC_2H_5)_4$ was added at once in the appropriate amount so that the Si:surfactant molar ratio was 20:1. The remainder of the preparation was identical to the preparation art of examples 7 through 11. The calcined templated products exhibited physico-chemical properties as described in Table 4.

TABLE 4

| Example | Template formula | Amount of template used. (g) | $d_{100}$ (nm) | HK pore diameter (nm) | BET Surface area ($m^2g^{-1}$) |
|---|---|---|---|---|---|
| 14 | $(PEO)_{13}$–$(PPO)_{30}$–$(PEO)_{13}$ | 5.0 | 7.5 | 8.5 | 1090 |
| 15 | $(PEO)_{13}$–$(PPO)_{30}$–$(PEO)_{13}$ | 10.0 | 7.1 | 6.7 | 1150 |
| 16 | $(PEO)_{13}$–$(PPO)_{30}$–$(PEO)_{13}$ | 15.0 | 6.1 | 5.8 | 1190 |

*The Material designation is MSU-3.

EXAMPLE 17

Example 17 demonstrates the viability of recovering the template from the inorganic structure prior to calcination through solvent extraction.

A 0.05 g quantity of the air dried and heat treated at 373° K but non-calcined product of Example 14 is examined by thermogravimetric analysis (TGA) under $N_2$ gas flow at a heating rate of 5° K C $min^{-1}$. One gram of the same air dried and non-calcined product of Example 14 is stirred in 100 milliliters of hot water ($\approx 363°$ K) for 3 h. The product is then filtered and washed with a second and a third 100 milliliter volumes of hot water. The filtered product is then dried at room temperature for 16 h. This product is then analyzed by TGA and vibrational spectroscopy.

EXAMPLES 18 and 19

This example demonstrates the ability of the present invention to prepare compositions whereby framework Si atoms have been substituted by different metal atoms, for example Ti.

A substituted or polymerized metal alkoxide compound is formed by reaction of $Si(OC_2H_5)_4$ with $Ti(OCH(CH_3)_2)_4$ such that the molar % of Ti for each composition was 0.5%, 1.0% and 5.0%. The appropriate amount of $Ti(OCH(CH_3)_2)_4$ is dissolved in the appropriate quantity of $Si(OC_2H_5)_4$ under stirring. The resultant solution is then heated under reflux at the boiling point of the $Si(OC_2H_5)_4$ (433° K ) for 4 h. The solution is then cooled to room temperature and added to a solution of nonionic polyethylene oxide based surfactant in the appropriate ratio as taught in Examples 1 through 16. The preparation art then follows that of Examples 7 through 11. The physico-chemical properties of Zr- and Ti-substituted MSU-1 compositions are presented in Table 5.

TABLE 5

| Material designation | Example | Template formula | % Metal | $d_{100}$ (nm) | HK (nm) | BET Surface area ($m^2g^{-1}$) |
|---|---|---|---|---|---|---|
| Zr-MSU-1 | 18 | $C_{11-15}(EO)_{12}$ | 5 | 4.9 | 3.0 | 950 |
| Ti-MSU-1 | 19 | $C_{11-15}(EO)_{12}$ | 5 | 4.9 | 2.8 | 940 |

EXAMPLES 20–23

This example describes the preparation art of nonionic surfactant templated mesoporous aluminum oxide.

The desired amount of PLURONIC 64L was dissolved under stirring at room temperature in 50 milliliters of an alcohol corresponding to the alkoxide ligand of the aluminum alkoxide inorganic precursor, which in the present art, was sec-butanol. The appropriate amount of $Al(OCH(CH_3)CH_2CH_3)_3$ was then dissolved in that solution such that the Al: surfactant molar ratio was 10:1. No precipitation reaction was observed at this point. An aliquot of deionized $H_2O$ was dissolved in 10 milliliters of sec-butanol such that the $H_2O$:Al molar ratio was 2:1. This solution was added very slowly to the Al/surfactant solution under stirring at room temperature. Gel and precipitate formation were observed at this point. The solution was stirred for 4 h after which another 25 milliliters of sec-butanol was added to disperse the gel. The resultant composition was stirred until homogeneous then left to stand for 16 h. The product was filtered, washed once with ethanol, dried in air at room temperature, heat treated at 373° K for 16 h then calcined in air at 773° K.

The physico-chemical properties of Examples 20–24 are presented in Table 6.

TABLE 6

| Material designation | Ex. | Template formula | Amount of template used.(g) | $d_{100}$ (nm) | HK pore diameter (nm) | BET Surface area ($m^2g^{-1}$) |
|---|---|---|---|---|---|---|
| MSU-3 Alumina | 20 | $(PEO)_{13}$–$(PPO)_{30}$–$(PEO)_{13}$ | 8.6 | 6.3 | 4.2 | 420 |
| MSU-1 Alumina | 21 | $C_{11-15}(EO)_9$ | 15 | 8.0 | 5.8 | 488 |
|  | 22 | $C_{11-15}(EO)_{12}$ | 14 | n.o. | 6.8 | 425 |
|  | 23 | $C_{11-15}(EO)_{20}$ | 14 | n.o. | 7.2 | 530 |
| MSU-4 Alumina | 24 | $C_{18}Ph(EO)_{18}$ | 14 | n.o. | 8.0 | 420 |

N.O. = Not observed in range 1–20° 2 theta.

EXAMPLES 24, 25, 26, 27

Mesoporous alumina molecular sieves, designated MSU-1, -2 and -3 aluminas, were prepared by the ambient temperature hydrolysis of aluminum tri-sec-butoxide using different types of nonionic polyethylene-oxide surfactants as the structure directing agents.

The synthesis of a representative product, MSU-3 alumina, prepared using a polyethylene oxide (PEO)—polypropylene oxide (PPO) co-polymer surfactant illustrates the general procedure for the preparation of a mesoporous alumina molecular sieve. The specific template employed was PLURONIC 64L (BASF Corp.), a tri-block co-polymer with specific stoichiometry $(PEO)_{13}$-$(PPO)_{30}(PEO)_{13}$. A solution containing 42 mmoles of the de-ionized water in 10 mL of anhydrous sec-butanol was then added very slowly (~1 mL $min^{-1}$) to a stirred homogeneous solution containing 2.1 mmoles of surfactant and 21 mmoles of aluminum tri-sec-butoxide in 25 mL of anhydrous sec-butanol. The overall reaction stoichiometry was, therefore, 0.1:1.0:2.0 surfactant:Al:water. After the addition of the water solution, the resulting gel was diluted in an equal volume of sec-butanol and allowed to age under stirring for 3 hours, during which time the white particles were observed to grow larger. The product was then further aged at room temperature without stirring for an additional 16 hours. The grainy, gelatinous product that separated from the solvent was filtered and washed with absolute ethanol to remove excess template, unreacted Al-alkoxide and solvent. The white powder was dried at room temperature for 16 hours and then at 373° K for 6 hours to encourage further condensation of the inorganic framework. Any remaining template was then removed by calcination in air at 773° K for 4 hours (heating rate, 2° K min$^{-1}$).

X-ray diffraction patterns were obtained with a Rigaku Rotaflex diffractometer equipped with a rotating anode and Cu-K$_\alpha$ radiation ($\lambda$=0.15418 nm). The TEM image was obtained with a JEOL 100CX microscope using an accelerating voltage of 120 kV and a 20 µm objective lens aperture. N$_2$ isotherms were obtained on a Coulter Omnisorp 360CX Sorptometer operated under continuous adsorption conditions. Framework confined mesopore sizes were determined by Barrett-Joiner-Halender (BJH) analysis of the N$_2$ desorption isotherm and Horvath-K awazoe analysis of the adsorption isotherm. Surface areas were determined by the BET method. $^{27}$Al MAS NMR spectra were obtained using a Varian VXR-400 NMR spectrometer equipped with a Varian MAS probe and SiN rotor. The spectrometer frequency was 104.22 MHz pulse width 2 ms, and sample spinning rate 6550 Hz.

Figure 17:
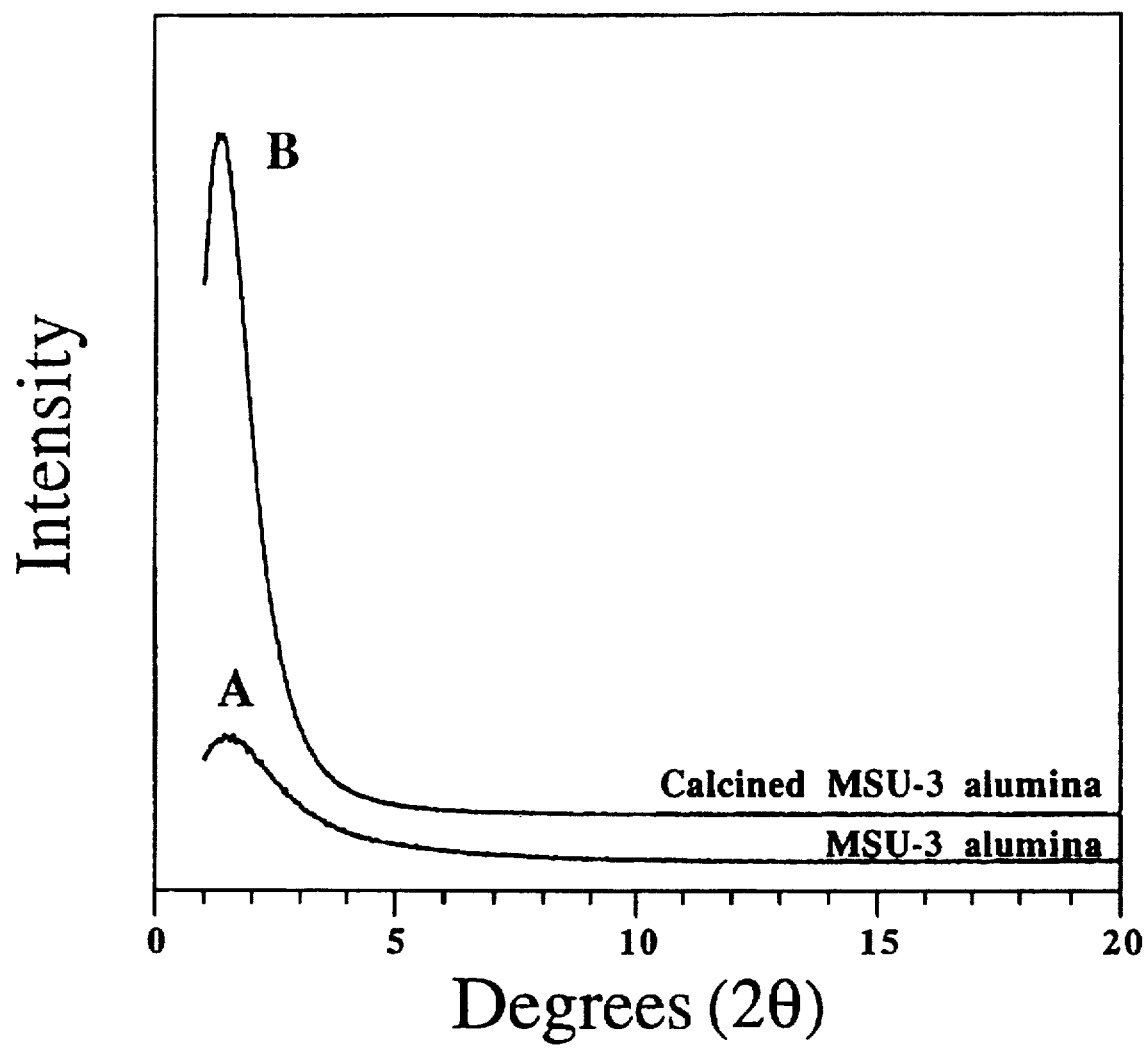
FIG. 17 shows powder X-ray diffraction patterns of MSU-3 alumina templated by Pluronic 64L surfactant: |A| as-synthesized sample after air drying at room temperature for 16 hr; |B| after calcination at 873° K in air for 6 h.

The powder X-ray diffraction (XRD) patterns shown in FIG. 17 for the as-synthesized and calcined forms of MSU-3 alumina prepared from a polyethylene oxide-polypropylene oxide co-polymer surfactant of the type (PEO)$_{13}$(PPO)$_{30}$(PEO)$_{13}$ contained moderately broad reflections at approximately 6.8 nm. The d$_{100}$ reflection for the calcined form was substantially more intense, but only slightly shifted to lower spacing, relative to the as-synthesized material. Similar single peak patterns also have been observed for disordered hexagonal MCM-41 (Chen, C-Y., et al., Microporous Materials 2, 17 (1993); and Hou, Q., et al., Chem. Mater. 6, 1176 (1994)) mesostructures prepared by electrostatic templating and for neutrally templated HMS (Tanev, P. T., et al., Science 267, 865 (1995)) and MSU-X silicas. The widths of the d$_{100}$ reflections of MSU-X aluminas were broader than those observed for hexagonally disordered MCM-41 materials, but similar to those of the MSU-X silicas. This XRD line broadening most likely is a result of a lower degree of structural order and a broader pore size distribution than observed for MCM-41 mesostructures.

Increases in the XRD intensities of mesostructured materials upon calcination are not restricted to the MSU-X families of materials. Similar observations have been preported for MCM-41 and HMS silicas. Modeling studies have shown that the removal of the occluded organic template from hexagonal mesostructures enhances the Bragg scattering cross-section. The decrease in the d$_{100}$ spacing (~0.2 nm) is attributed to a contraction of the inorganic framework upon the removal of the organic template. Several alumina mesostructures prepared from other nonionic templates (see below) exhibited d$_{100}$ reflections greater than 9.0 nm.

Figure 18:
FIG. 18 shows a transmission electron micrograph of MSU-1 alumina templated by Tergitol 15-S-9 surfactant and calcined at 773° K in air. A worm-like motif of regular mesopores of approximately 3.0 nm in diameter is observed.

PEO—based surfactants adopt spherical to long "worm-like" micellar structures in aqueous solution (Porter, M. R., Handbook of Surfactants 2nd ed, Blackie Academic & Professional, London (1994); Chu, B., Langmuir 11,414 (1995); and Lin, Z., et al., Langmuir, 8, 2200 (1992)). The pore structures of MSU-X aluminas prepared from these NO templates reflect the novel worm-like motif of the assembled surfactant. The worm-like channels, though more or less regular in diameter, have no desirable range order. That is the packing channel system appears to be random, despite the presence of an XRD reflection. Clearly the disordered channel system of the MSU-X aluminas is in marked contrast to the long range hexagonal arrangement of channels formed for MCM-41 and HMS mesostructures (C. T. Kresge, et al., Nature 359:710 (1992); and P. T. Tanev, et al., Science, 267:865 (1995)). Evidence for this unprecedented mesopore structure was obtained from transmission electron micrograph (TEM) images of MSU-1 alumina prepared from the alkylated PEO surfactant TERGITOL 15-S-9 (Union Carbide). As shown by the micrograph in FIG. 18, the alumina particles indeed are penetrated by a worm-like motif of channels of regular diameter.

Figure 19A:
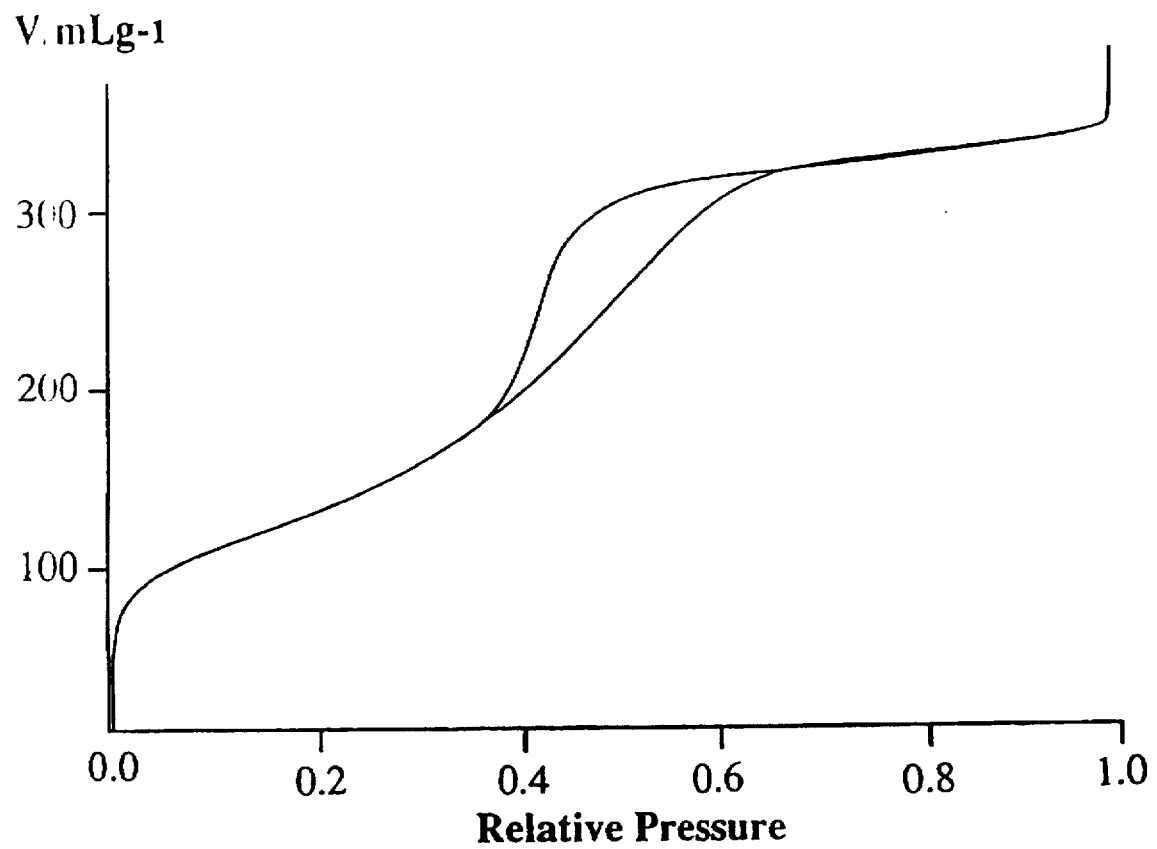
FIG. 19a shows a nitrogen adsorption and desorption isotherms for MSU-3 alumina templated by Pluronic 64L and calcined at 773° K in air for 4 h. The volume of $N_2$ sorbed is expressed at standard temperature and pressure; $P/P_0$ is the partial pressure of nitrogen in equilibrium with the sample at 77° K.

FIG. 19 provides a representative N$_2$ adsorption/desorption isotherm for a MSU-3 alumina calcined at 773° K. All of the MSU-X aluminas prepared by PEO surfactant templating display a similar, broad, but well defined, step in the adsorption isotherm at P/P$_0$≈0.45–0.8 and a hysteresis loop in the desorption isotherm over the same relative pressure range. These features result from the condensation of the adsorbate within the framework-confined mesopores (Branton, P. J., et al., J. Chem. Soc. Faraday Trans. 90, 2965 (1994)) and not from interparticle pores (Gregg, S. J., et al., Adsorption, Surface Area and Porosity, 2nd ed., Academic Press London (1982)). The lack of textural mesoporosity is indicated further by the absence of a hysteresis loop above P/P$_0$=0.8 (Tanev, P. T., et al., Science 267, 865 (1995)). Some 'necking' or 'blocking' of the pore structure, perhaps caused by the intersection or overlapping of the worm-like surfactant micelles, is suggested by the sharp curvature in the desorption leg of the framework-confined hysteresis loop.

Figure 19B:
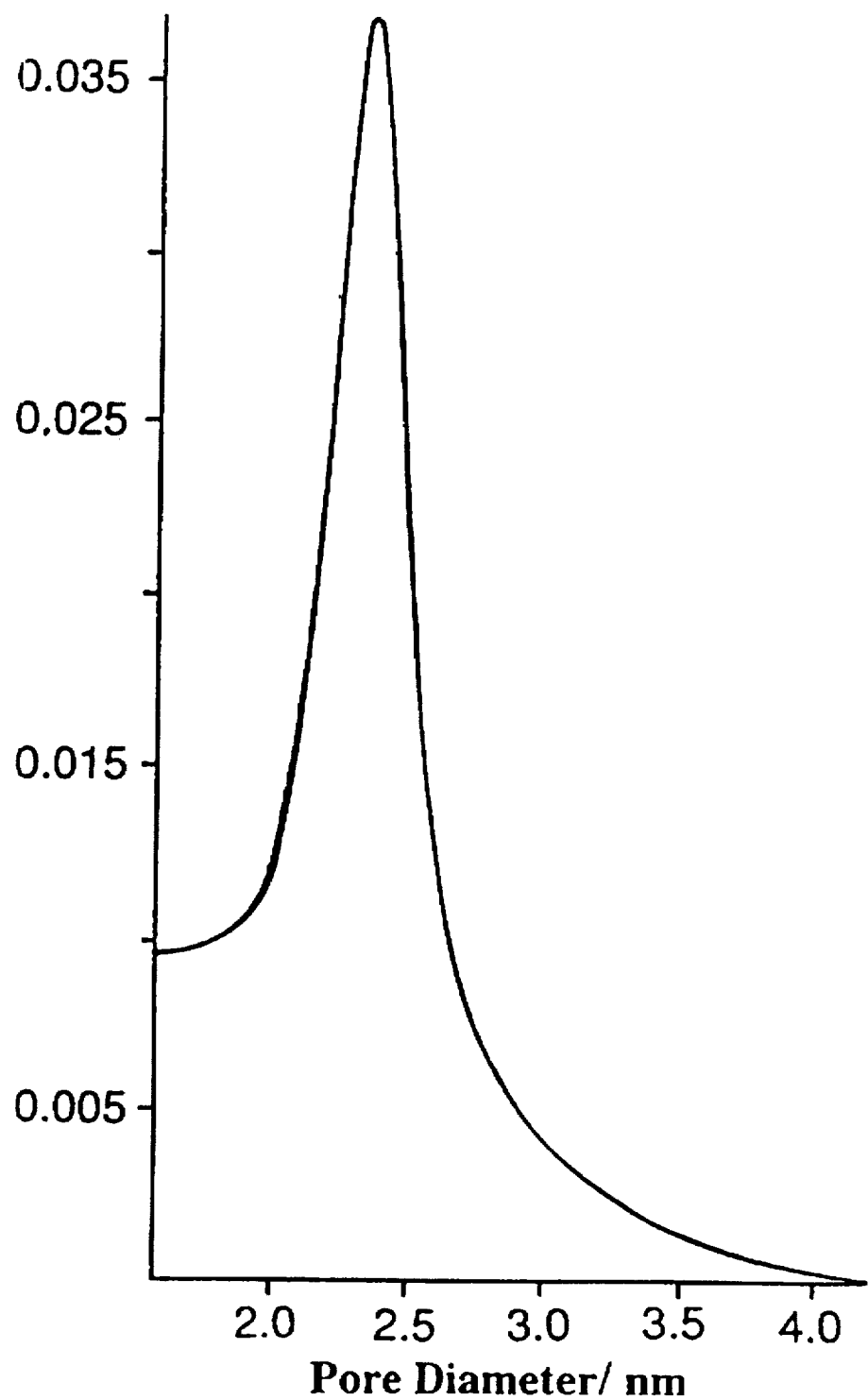
FIG. 19B shows Corresponding Barrett-Joiner-Halender pore size distribution determined from the $N_2$ adsorption isotherm; dW/dR is the derivative of the normalized $N_2$ volume adsorbed with respect to the diameter of the adsorbent. Prior to analysis, the samples were evacuated at 423° K, $10^{-6}$ torr for 16 hours.

Most previously reported studies of mesoporous molecular sieves have made use of the Horvath-K awazoe (HK) model (Horvath, G., et al., J. Chem. Eng. Jpn. 16,470 (1983)) for the determination of pore size distributions from N$_2$ adsorption isotherms. This model, developed for microporous lamellar carbons, assumes slit-like micropores. Therefore, its applicability to materials with larger, cylindrical mesopores is likely to be limited. In this report, we have applied in addition to the HK model both the Cranston-Inkley (CI) (Cranston, R. W., et al., Advances in Catalysis, 9,143 (1970)) and the Barrett-Joyner-Halender (BJH) (Barrett, E P., et al., J. Amer. Chem. Soc. 73,373 (1951)) models to the determination of framework pore size. Directly comparable pore size values were obtained when the CI and BJH models were applied to the N$_2$ adsorption and desorption branches, respectively. However, significantly larger pore diameters were obtained from fitting the adsorption data in the HK model. For instance, as shown in FIG. 19B, the BJH pore-size distribution for MSU-3C alumina calcined at 773° K is centered at 2.4 nm, whereas the HK model affords a value of 4.8 nm. Measurement of the pores observed in the TEM micrograph of MSU-1 alumina templated by TERGITOL 15-S-9 (FIG. 18) produced values of about 2.6 nm. This compares well to the corresponding BJH value of 3.3 nm.

Table 7 provides the basal spacings, surface areas, pore volumes, and the HK and BJH pore sizes for MSU-X aluminas prepared from different families of PEO-based surfactants.

TABLE 7

Physico-chemical properties of MSU-X mesoporous alumina molecular sieves after calcination in air at 773K.

| Material designation | Template | Surfactant formulae | Amount of Template [mmol][a] | Surface area [m$^2$g$^{-1}$] | $d_{100}$ [nm] | HK[b] Pore size [nm] |
|---|---|---|---|---|---|---|
| MSU-1 aluminas | #Tergitol 15-S-9 | $C_{11-15}[EO]_9$ | 10.7 | 490 | 8.0 | 5.5 |
| | Tergitol 15-S-12 | $C_{11-15}[EO]_{12}$ | 8.5 | 425 | 8.5 | 6.5 |
| | Tergitol 15-S-20 | $C_{11-15}[EO]_{20}$ | 5.8 | 535 | 9.0 | 7.0 |
| MSU-2 aluminas | *Igepal RC-760 | $C_{12}Ph[EO]_{18}$ | 5.9 | 420 | 9.6 | 8.0 |
| | †Triton X-114 | $C_8Ph[EO]_8$ | 9.0 | 460 | >9.0 | 8.0 |
| | Triton X-100 | $C_8Ph[EO]_{10}$ | 11.2 | 445 | >9.0 | 8.0 |
| MSU-3 alumina | ‡Pluronic 64L | $[PEO]_{13}$–$[PPO]_{30}$–$[PEO]_{13}$ | 2.1 | 430 | 6.8 | 4.0 |

[a]All syntheses were performed at a surfactant concentration of 25 wt %.
[b]Mesopore volume for pores between 2.0 and 8.0 nm diameter of the BJH analyses.
Tergitol 15-S-x surfactants kindly supplied by Union Carbide Corp. (United States)
*Igepal RC-760 kindly supplied by Rhone-Poulenc Co. (France)
†Triton-X surfactants supplied by Aldrich Co.
‡Pluronic 64L kindly supplied by BASF Co. (Detroit, MI)

A mesostructure templating effect is indicated by the increase in both the $d_{100}$ reflections and pore diameters with increasing size of the surfactant molecule. Since the MSU-X aluminas exhibit similar pore sizes but larger crystallographic repeat distances than those of MSU-X silicas, (Bagshaw, S. A., et al., Science, 269,1242 (1995)) we conclude that the pore wall thicknesses of the aluminas are substantially greater than those of the silica analogs. This is consistent with the observation that the Brunauer-Emmett-Teller (BET) (Gregg, S. J., et al., Adsorption, Surface Area and Porosity, 2nd ed., Academic Press, London (1982)) surface areas of the aluminas calcined in air at 773° K range from 420 to 535 m$^2$ g$^{-1}$, whereas MSU-X silicas give values twice as large. Nevertheless, the surface areas and pore volumes for our MSU-X aluminas are substantially higher than those of commonly available amorphous and crystalline forms of alumina (Poisson, R., et al., in catalyst Supports and Supported Catalysts, (Ed: A. B. Stiles), Butterworths, Boston, p. 11 (1987)) prepared by traditional sol-gel or flash-calcination techniques (Gates, B. C., in Materials Chemistry: An Emerging Discipline, American Chemical Society, Washington, D.C., p. 301 (1995)).

Figure 20:
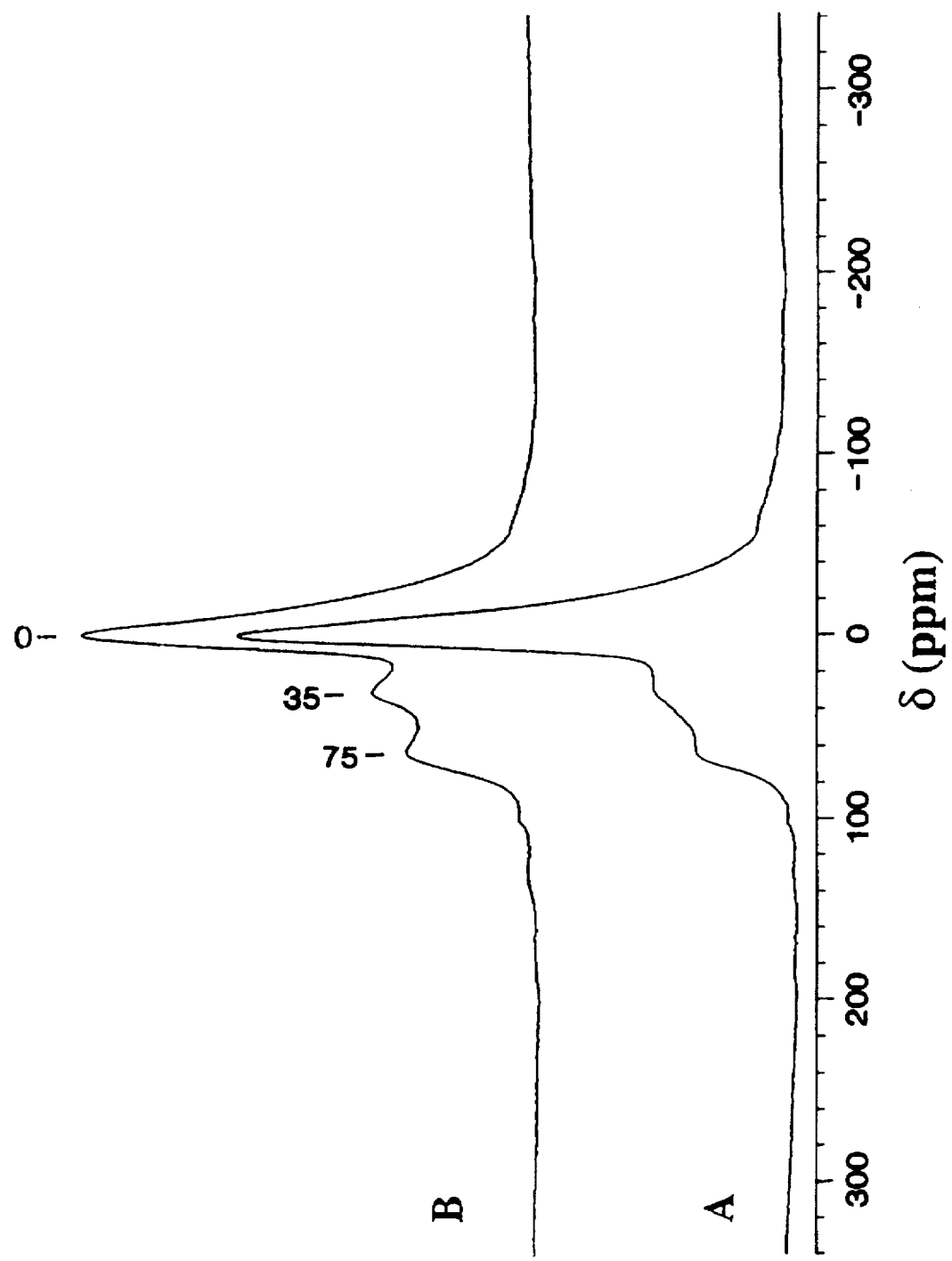
FIG. 20 shows a $^{27}Al$ MAS NMR spectra of MSU-3 alumina templated by Pluronic 64L surfactant: A as-synthesized sample after air drying at room temperature for 16 hours; B after calcination at 773° K in air for 4 hours. The chemical shifts are referenced to external $Al[H_2O]_6^{3+}$.

The nature of the coordination environment of aluminum in MSU-X aluminas was examined using $^{27}Al$ MAS NMR spectroscopy. Spectra of as-synthesized and calcined MSU-3 alumina (FIG. 20) display three resonances, uncorrected for quadrupolar shift, at δ=0, 35 and 75 ppm. These chemical shifts are indicative of the existence of aluminum in three different oxygen coordination environments (Akitt, J. W., Prog Nucl. Magn. Reson. Spectroasc. 21, 127 (1989); and Cruickshank, M. C., et al., J. Chem. Soc. Chem. Commun. 23 (1986)). The resonances at δ=35 and 75 are assigned to six-coordinated ($Al_{oct}$) and four-sites coordinated ($Al_{tet}$) centers, respectively, while the sites giving rise to the resonance at δ=35 are assigned to Al atoms in a five-fold coordination geometry ($Al_{pent}$) (Akitt, J. W., Prog. Nucl. Magn. Reson. Spectroasc., 21, 127 (1989); and Cruickshank, M. C., et al., J. Chem. Soc. Chem. Commun. 23 (1986)).

In the as-synthesized material the dominant species is $Al_{oct}$ with the resonances due to $Al_{tet}$ and $Al_{pent}$ showing weaker intensities. After calcination at 773° K, however, the intensities of both the $Al_{tet}$ and the $Al_{pent}$ signals increase at the expense of the $al_{oct}$ signal. In the as-synthesized form, coordination of surface Al atoms to the surfactant may be observed as $Al_{oct}$. After removal of the surfactant, these Al atoms may adopt $Al_{pent}$ environments. Another possibility is defect site formation during the calcination procedure, wherein Al atoms in 6-fold coordination within the inorganic framework are transformed into lower coordination geometries upon dehydroxylation.

Porous aluminas (Adkins, H., et al., J. Amer. Chem. Soc. 73, 2184 (1951); and Basmadjian, D., et al., J. Catal. 1, 547 (1962)) and aluminates (Sned. R., Appl. Catal. 12, 347 (1984)) have been prepared previously from alkoxide precursors in the presence of organic pore regulating agents such as methyl cellulose or short chain quaternary ammonium cations. Although these organic modifiers exhibited structure directing properties for zeolite syntheses (Introduction to Zeolite Science and Practice, (Eds: H. van Bekkum, E. M. Flanigen, J. C. Jansen) Elsevier, Amsterdam (1991)), they afforded aluminas that were X-ray amorphous. Consequently, these earlier alumina synthesis reactions involved modifier encapsulation, but not templating processes. Alumina aerogels with surface areas near 500 m$^2$g$^{-1}$ also have been reported (Chen, C-M., et al., Studi. Surf. Sci. Catal. 91, 427 (1995)), but the pore structures of these low bulk density materials were purely textural. In contrast, the N°I° templating reactions of the present invention provide low cost, environmentally benign, ambient temperature routes to aluminas with a novel, random worm-like pore motif. Because of their unprecedented pore structure, thermal stability, high surface area and multiple aluminum coordination environments, these novel mesostructures offer promising opportunities for new materials applications, particularly in chemical catalysis and molecular separations.

Although aluminas are widely used as industrial catalysts and catalyst supports, all of these known materials possess only textural pores and lack the regular framework-confined porosity of a molecular sieve. The present invention uses low cost, non-toxic and recyclable polyethylene-based surfactants to prepare new mesoporous alumina molecular sieves with properties of potential commercial importance to petroleum refining. Textural aluminas already enjoy an especially important role in Fluid Catalytic Cracking (FCC) (of petroleum) microsphere technology. One of the major functions of alumina is to trap metal ion contaminants in the feed, particularly nickel. Alumina also mediates the porosity of the microsphere and moderates the Bronsted/Lewis acidity. These latter factors help control the light gases and coke make of the cracking reactions and the catlayst deactivation rate. Substantial improvements in FCC cracking performance can be realized by adding new molecular sieve functionality to the alumina components. In addition to tailoring the pore structure and shape selectivity of these new molecular sieves, modifiers (e.g. zirconia and other metals) can be incorporated into the aluminas in order to reduce the acidity under FCC, hydrotreating and mild hydrotreating conditions. The pore structure of these new sieves is sufficiently large to support monolayers of $MoS_2$ for improved hydrotreating applications. The alumina molecular sieves are particularly useful for heavy residual cracking (i.e., the heavier fractions of petroleum not processable by conventional zeolite-based catalysts); mild hydrocracking of petroleum (low $H_2$ pressure); and hydrocracking (high $H_2$ pressure) of petroleum.

It is intended that the foregoing description be only illustrative of the present invention and that the present invention be limited only by the hereinafter appended claims.

We claim:

1. A synthetic, semi-crystalline inorganic oxide composition having at least one resolved x-ray reflection corresponding to a lattice spacing of 3 to 10 nm, framework confined channels between about 2 and 10 nm diameter, and a specific surface area of 300 to 1400 square meters per gram and having a disordered assembly of worm channels.

2. A synthetic, semi-crystalline inorganic oxide composition prepared by reacting a mixture of a non-ionic poly (alkylene oxide) derived surfactant as a template (N°) and a neutral inorganic oxide precursor (I°), followed by hydrolysis and crosslinking of the inorganic oxide precursor to provide the composition and having a disordered assembly of worm channels.

3. The composition of claim 2 wherein the template is removed from the composition.

4. The composition of claim 2 wherein the surfactant has a terminal hydroxyl group.

5. The composition of claim 2 which has the formula:

$nR\text{-}EO/A_xO_y$ wherein $A_xO_y$ is an anhydrous form of the composition, wherein R-EO is selected from the group consisting of nonionic alkyl polyethylene oxide, alkyl and aryl polyethylene oxide, and polyethylene oxide-polypropylene oxide-polyethylene oxide block co-polymer molecules, A is a metal atom; O is oxygen and x and y are the molar stoichiometries of A and O, such that in the composition when calcined, n is about 0, x is about 1 and y is between about 1 and 3.

6. The composition of claim 2 which has the formula:

$nR\text{-}EO/A_vG_wSi_xD_yO_z$ wherein $A_vG_wSi_xD_yO_z$ is an anhydrous form of the composition, wherein R-EO is selected from the group consisting of nonionic alkyl polyethylene oxide, alkyl and aryl polyethylene oxide and polyethylene oxide-polypropylene oxide-polyethylene oxide block co-polymer molecules wherein when R-EO is present n is between about 0.01 and 1; A is at least one optional trivalent element selected from the group consisting of B, Cr, Al, Ga and Fe; G is at least one optional tetravalent metallic element selected from the group consisting of Sn, Ge, Ti, V, Hf and Zr; Si is silicon; D is optional and is a pentavalent or hexavalent element selected from the group consisting of Sb, Cr, Nb, Ta, V, W and Mo; O is oxygen and v, w, x, y and z are the molar stoichiometries of A, G, Si, D and O respectively, wherein in the composition when calcined, n is about 0, $0 \leq v \leq 2$, $0 \leq w \leq 1$, $0 \leq x \leq 1$, $0.001 \leq y \leq 2$ and $1 \leq z \leq 3$.

7. The composition of claim 2 having X-ray diffraction patterns with at least one reflection corresponding to a lattice spacing of between about 3 to 10 nm.

8. The composition of any one of claims 1 or 2 which after calcination, has an $N_2$, $O_2$ or Ar adsorption-desorption isotherm that has a step at $P/P_O$ equal to between 0.2 and 0.7.

9. The composition of claim 8 wherein a ratio of textural to framework-confined mesoporosity as determined by the $N_2$, $O_2$ or Ar adsorption isotherm is less than or equal to about 0.2.

10. The composition of claim 2 wherein said composition has a specific surface area between 300 and 1400 m² per gram.

11. The composition of claim 2 wherein a molar ratio of nonionic surfactant to inorganic oxide precursor in the reaction mixture is between 0.01 and 1.0.

Figure 3:
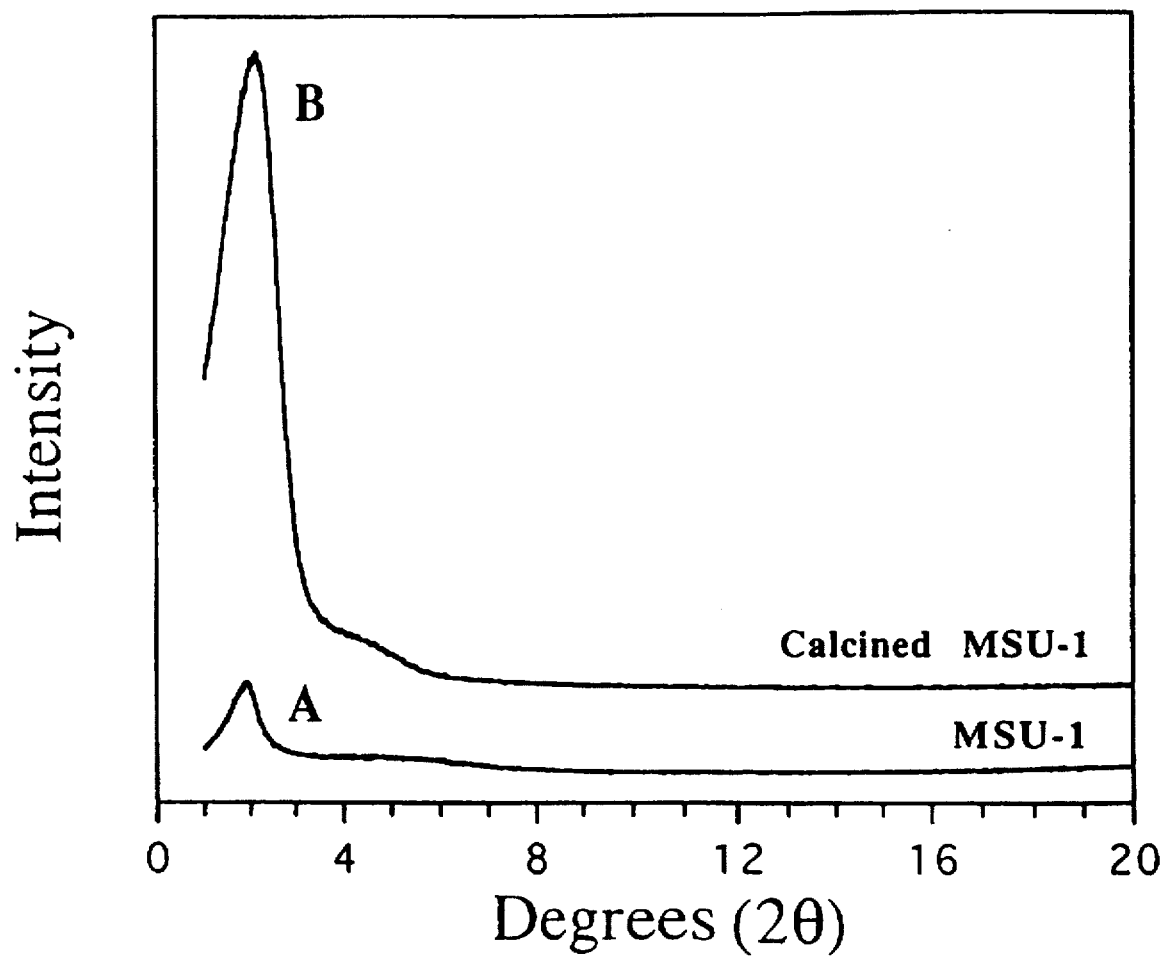
FIG. 3 is a graph showing the X-ray powder diffraction patterns of the as synthesized (curve A) and calcined (curve B) MSU-1 products from Example 3.
Figure 5:
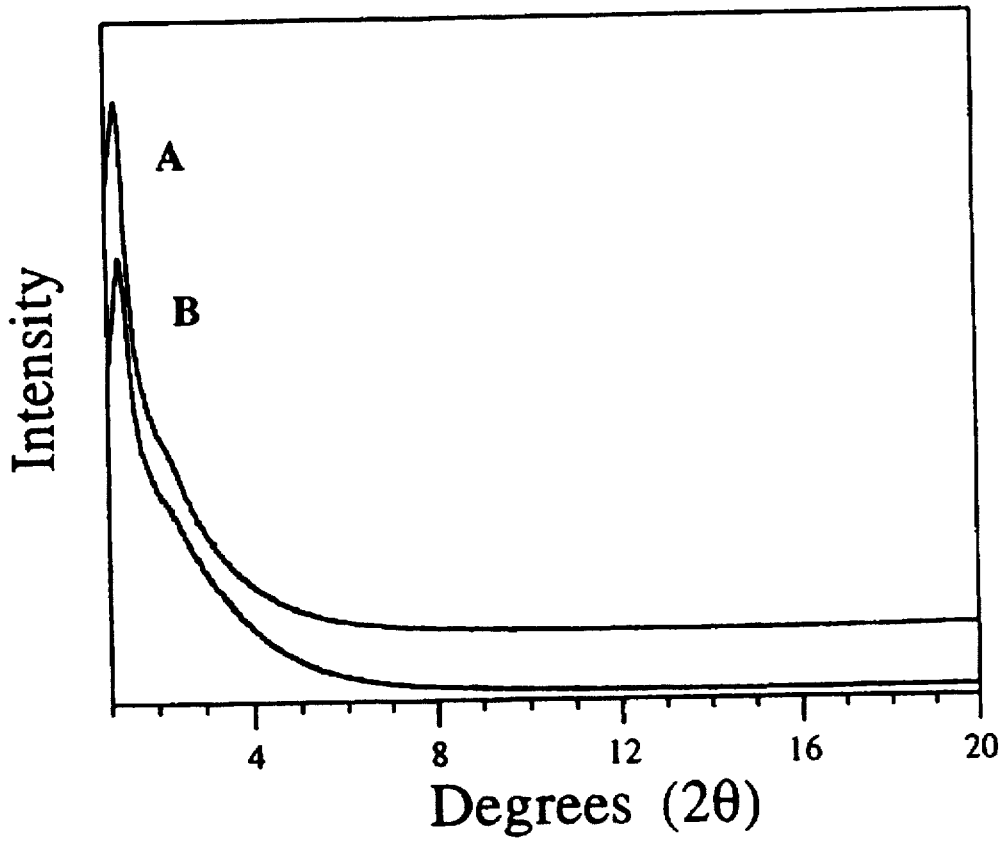
FIG. 5 is a graph of the X-ray powder diffraction patterns of the as synthesized (curve A) and calcined (curve B) MSU-3 products from Example 16.

12. The composition of claim 1 having an X-ray diffraction pattern selected from the group consisting of FIGS. 3 and 5.

Figure 4:
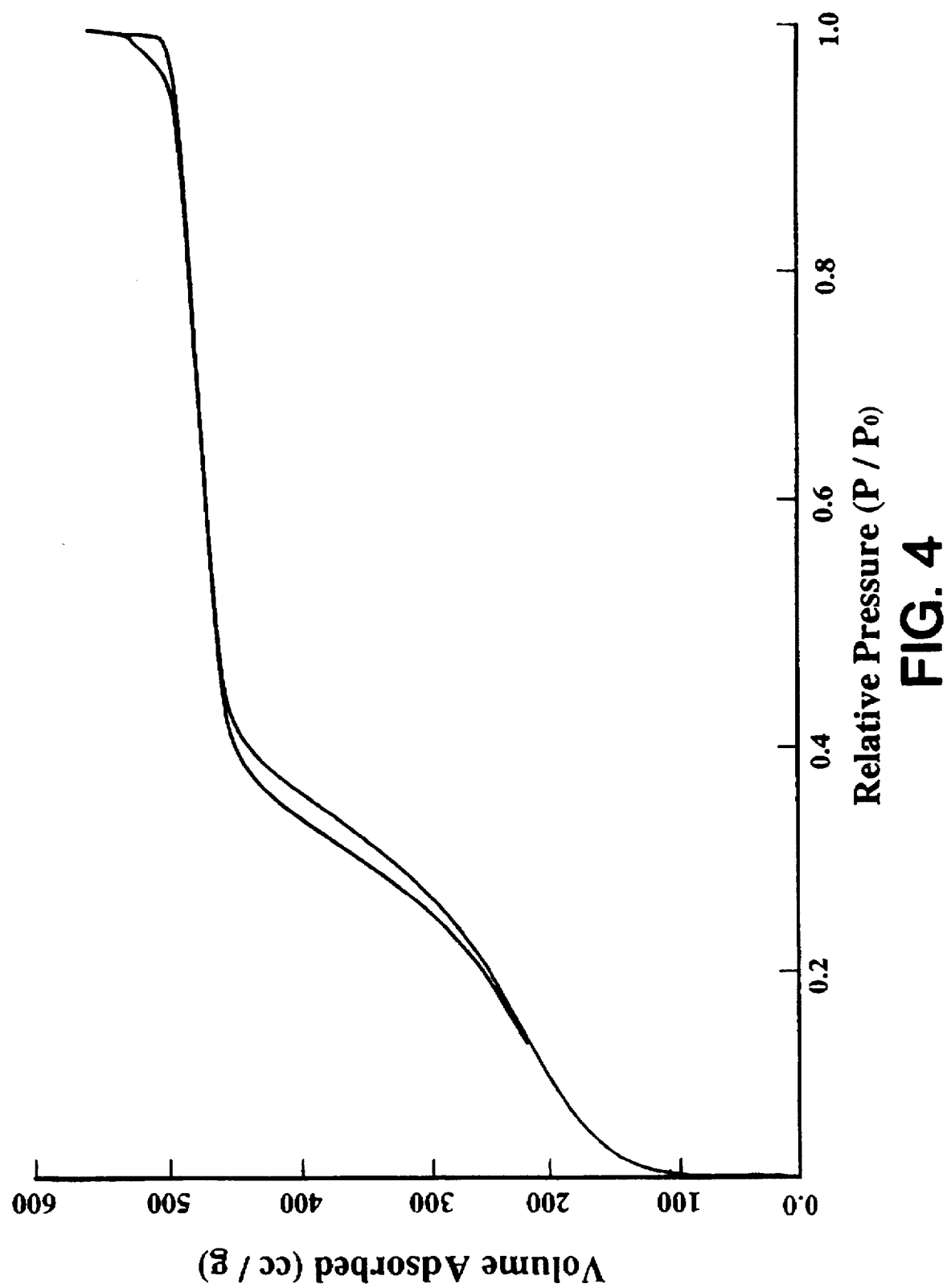
FIG. 4 is a graph of the $N_2$ adsorption-desorption isotherm for the calcined MSU-1 product from Example 3.
Figure 4A:
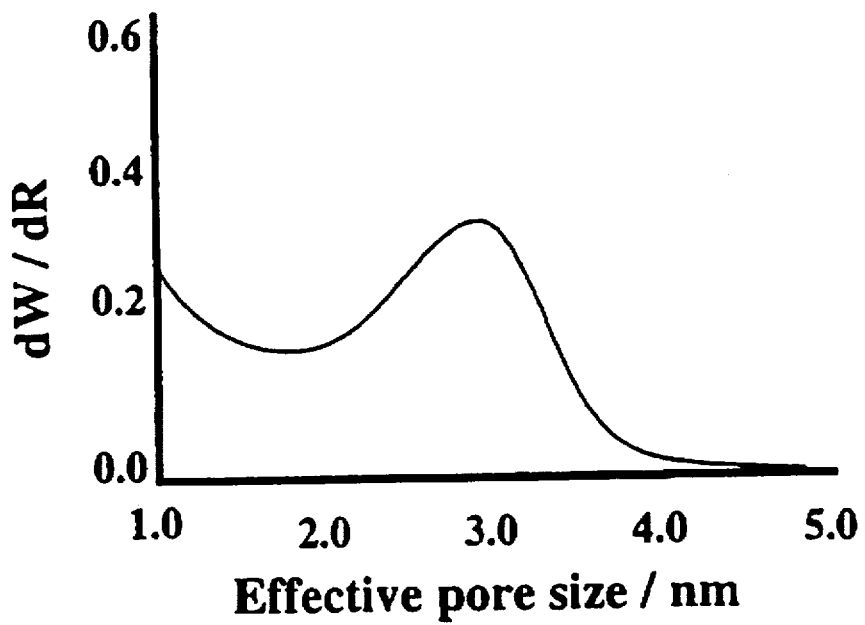
FIG. 4A is a graph of the corresponding Horvath-Kawazoe framework-confined mesopore size distribution curve.
Figure 6:
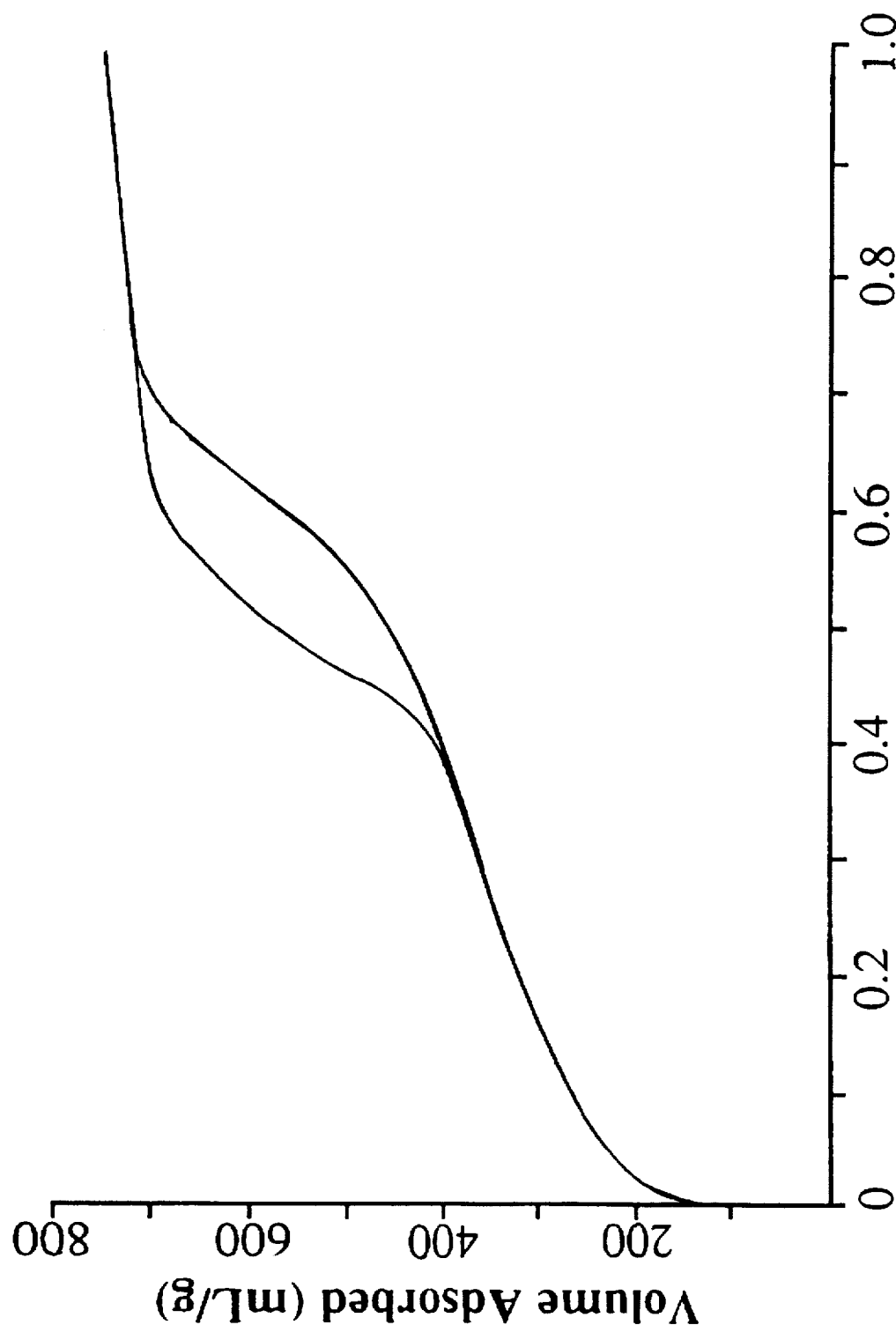
FIG. 6 is a graph of the $N_2$ adsorption-desorption isotherm for the calcined MSU-3 product from Example 16.
Figure 6A:
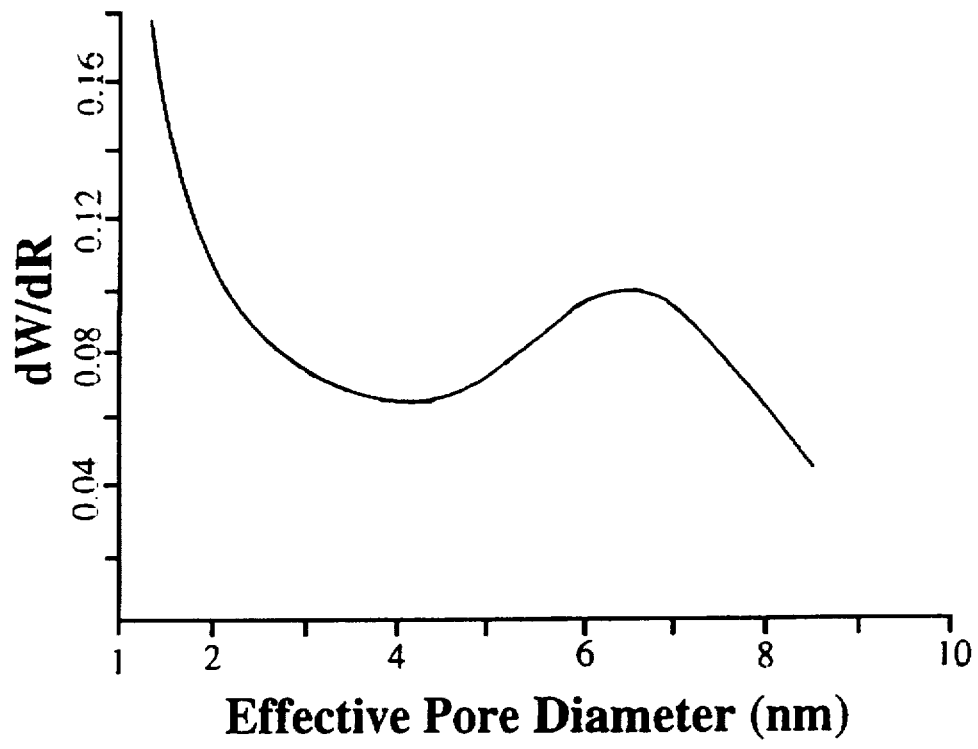
FIG. 6A is a graph of the corresponding Horvath-Kawazoe framework-confined mesopore size distribution curve.

13. The compositions of claim 1 having an $N_2$ adsorption-desorption isotherms and Horvath-Kawazoe pore size distribution selected from the group consisting of FIGS. 4A and 6A.

14. The composition of claim 2 in which the template has been removed by calcination.

15. The composition of claim 2 in which the template has been removed through solvent extraction.

Figure 7:
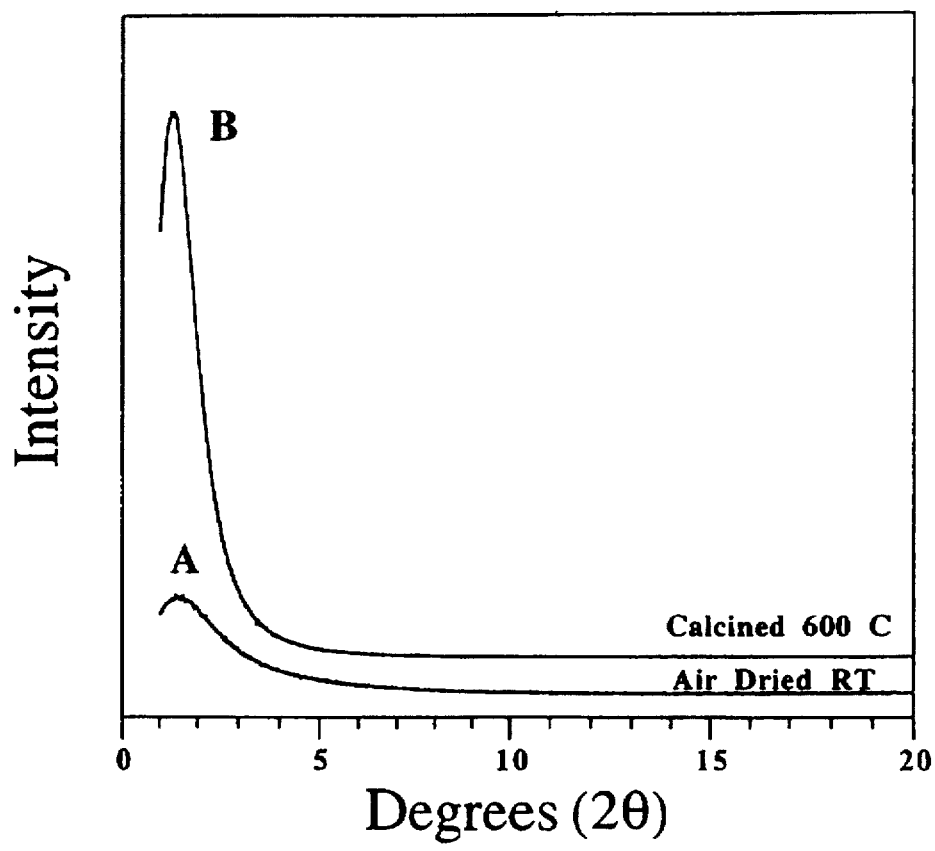
FIG. 7 is a graph of the X-ray powder diffraction patterns of the as-synthesized (curve A) and calcined (curve B) MSU-3 Alumina products of Example 19.

16. The composition of claim 1 having an X-ray diffraction pattern as shown in FIG. 7.

Figure 8:
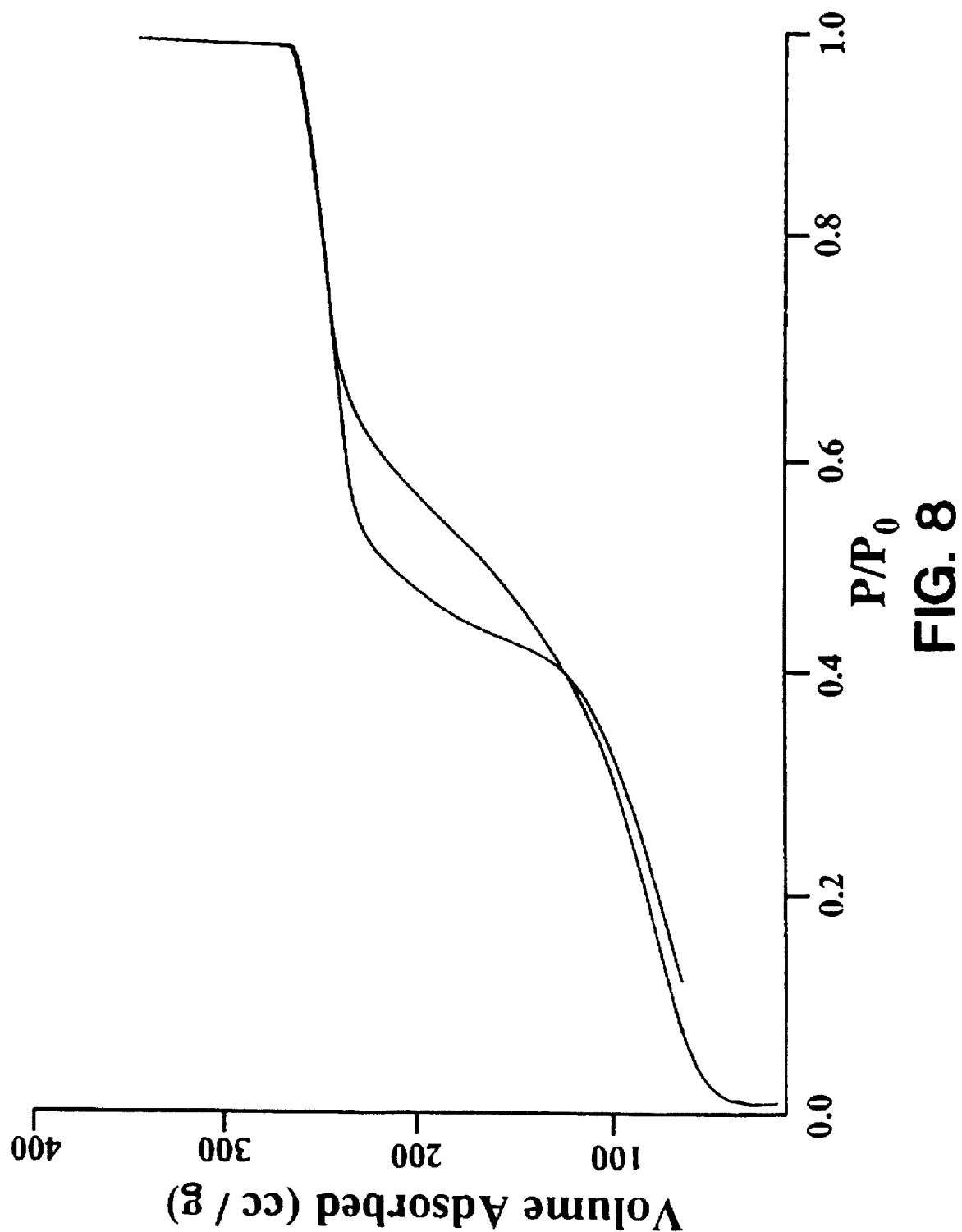
FIG. 8 is a graph of the $N_2$ adsorption-desorption isotherm for the calcined MSU-3 Alumina product from Example 19.
Figure 8A:
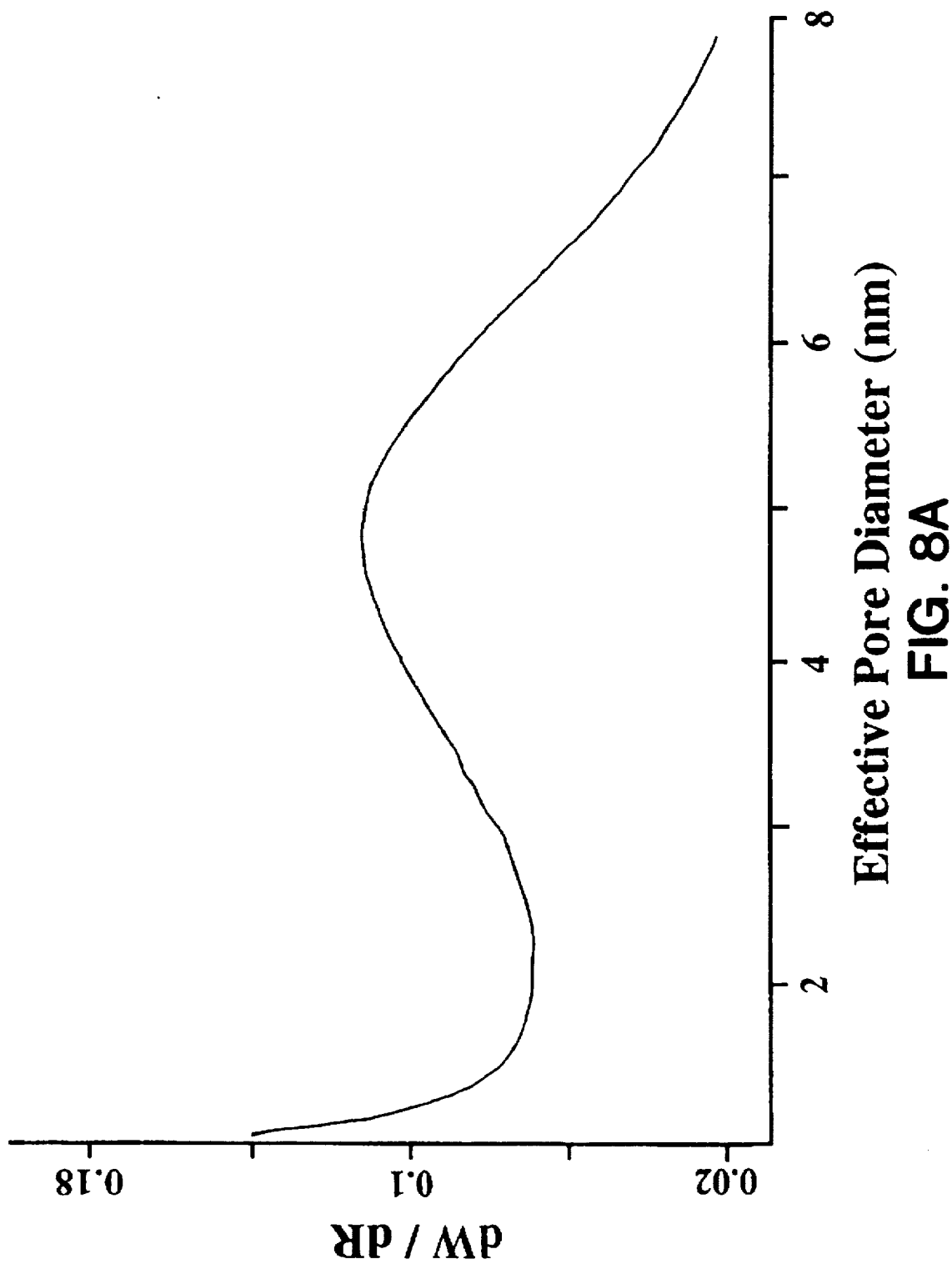
FIG. 8A is a graph of the corresponding Horvath-Kawazoe framework-confined mesopore size distribution curve.

17. The composition of claim 1 having $N_2$ adsorption-desorption isotherms and Horvath-Kawazoe pore size distribution as shown in FIG. 8A.

18. The composition of claim 6 in which the template has been removed by calcination.

19. The composition of claim 6 in which the template has been removed through solvent extraction.

20. The composition of any one of claims 1 or 2 in which at least one transition metal is dispersed or impregnated in the channels in the composition, selected from the group consisting of Rh, Nb, Re, Ag, Au, Cu, Co, Cr, Ni, Fe, Ir, Mo, Pt, Pd, Sn, Ti, V, W, Zn and Zr.

21. The composition of any one of claims 1 or 2 containing transition metal substituted organic macrocycles in the channels.

22. The composition of any one of claims 1 and 2 wherein the composition has surfaces functionalized by an alkyl metal alkoxide.

23. The composition of any one of claims 2 and 6 wherein upon removal of the template the composition has surfaces that have been functionalized by reaction with metal carboxylate precursors, silylation reagents or alkylating reagents.

24. The composition of any one of claims 1 or 2 wherein surfaces of the compositions have been functionalized by reaction of the composition upon removal of the template and calcination with various reagents selected from the group consisting of metal nitrates, chlorides, fluorides, silylation reagents and alkylation reagents.

25. The compositions of claim 2 wherein the template (N°) is selected from the group consisting of primary, secondary and tertiary fatty alcohol poly(ethoxylates).

26. The compositions of claim 2 wherein the nonionic template (N°) is an alkyl phenol poly-(ethoxylates).

27. The compositions of claim 2 wherein the nonionic template (N°) is a fatty acid ethoxylate.

28. The compositions of claim 2 wherein the nonionic template (N°) is a poly(ethylene oxide-propylene oxide) block co-polymer.

29. The composition of claim 2 wherein the template (N°) is selected from the group consisting of primary and secondary fatty amine poly(ethoxylate).

30. The composition of claim 2 wherein the template (N°) is a fatty acid poly(ethylene oxide-propylene oxide) block co-polymer.

31. The composition of claim 2 wherein the template (N°) is selected from the group consisting of fatty acid alkanolamides and ethoxylates.

32. The composition of claim 1 wherein the template (N°) is selected from the group consisting of sorbitan esters and sorbitan ethoxylates.

33. The composition of claim 1 wherein the inorganic oxide is alumina.

34. The composition of claim 1 wherein the template (N°) is a polyamine propoxylate ethoxylate.

35. A method for the preparation of a synthetic semi-crystalline inorganic oxide composition which comprises:
   (a) mixing (i) a neutral inorganic oxide precursor (I°) containing at least one element selected from the group consisting of di-, tri-, tetra-, penta- and hexavalent elements and mixture thereof; (ii) a non-ionic poly (alkylene oxide) surfactant (S°) as a template; and (iii) a hydrolyzing agent to form a gel containing the composition;
   (b) separating at least some of the hydrolyzing agent and the surfactant from the gel to form the composition; and
   (c) optionally calcining the composition wherein the composition has a disordered assembly of worm channels.

36. The method of claim 35 wherein the gel is prepared by a random order of addition of the template and neutral inorganic oxide precursor.

37. A method for the preparation of a synthetic, semi-crystalline inorganic oxide composition which comprises:
   (a) preparing a solution of a neutral inorganic oxide precursor (I°), containing at least one element selected from the group consisting of di-, tri-, tetra-, penta- and hexavalent elements and mixtures thereof with stirring and optionally aging the inorganic oxide precursor (I°) solution;
   (b) preparing a homogeneous solution of a nonionic poly(alkylene oxide) surfactant (S°) as a template in a hydrolyzing agent, and optionally in a co-solvent, by stirring it at a temperature between about minus 20° and plus 100° C.;
   (c) mixing of the solutions of steps (a) and (b) at a temperature between about minus 20° and plus 100° C. to form a gel which is aged for at least about 30 minutes to form the composition;
   (d) separating at least some of the hydrolyzing agent and surfactant from the composition; and
   (e) optionally calcining the composition, wherein the composition has a disordered assembly of worm channels.

38. The method of claim 37 wherein the neutral precursor is selected from the group consisting of a metal alkoxide, an inorganic complex, a colloidal inorganic oxide solution, an inorganic oxide sol and mixtures thereof.

39. The method of claim 37 wherein said inorganic oxide precursor solution is mixed without aging.

40. The method of claim 37 wherein the template is separated from the composition and as an additional step recycled after step (d).

41. The method of claim 40 wherein the template is separated by extraction with a solvent selected from the group consisting of a neutral organic solvent, water and mixtures thereof.

42. The method of claim 37 wherein in step (a) the stirring is at a temperature of at least minus 20° C. for at least 5 minutes.

43. The method of claim 37 wherein the composition is calcined at about 300° to 1000° C. for at least about 30 minutes.

44. The method of claim 37 wherein the inorganic oxide is alumina.

45. A method for the preparation of a semi-crystalline inorganic oxide composition which comprises:
   (a) preparing a homogeneous solution of nonionic poly (ethylene oxide) surfactant as a template (N°) in a lower alkyl alcohol solvent by mixing at ambient temperature;
   (b) adding an inorganic metal precursor to the solution of step (a) at ambient temperature under stirring for at least 30 minutes to form a homogeneous solution;
   (c) slowly adding a solution of a hydrolyzing agent to the homogeneous solution to form a gel as a first precipitate in the solution;
   (d) aging of the first precipitate with stirring;
   (e) redispersing the first precipitate in a lower alkyl alcohol;
   (f) aging the redispersion under stirring at ambient temperature for 16 to 48 hours to form a second precipitate;
   (g) separating the solution, lower alkanol and at least some of the template from the second precipitate by washing once with ethanol;
   (h) drying the second precipitate in air at ambient temperature to form the composition;
   (i) optionally heat treating the composition to at least 373° K in air for at least 16 hours;
   (j) optionally removing the template form the composition by solvent extraction; and
   (k) optionally calcining the composition at a temperature between about 673° K and 973° K in air for at least 4 hours to remove any remaining template and to cross-link the composition, wherein the composition has a disordered assembly of worm channels.

46. The method of claim 45 wherein the calcining is by combustion in air.

47. A method for the preparation of synthetic, semi-crystalline inorganic silicon dioxide composition which comprises:
   (a) preparing a homogeneous aqueous solution of a non-ionic poly(ethylene oxide) derived surfactant template (N°) with mixing at ambient temperature;
   (b) adding an inorganic silica precursor to the solution of step (a) at ambient temperature with stirring to form a solid, precipitate;
   (c) aging the precipitate with stirring at ambient temperature for between 16 and 48 hours;
   (d) separating the aqueous solution and template from the precipitate followed by washing once with deionized water;
   (e) drying the precipitate in air at ambient temperature;
   (f) heat treating the air dried precipitate in air at least 373° K for at least 16 hours;
   (g) optionally removing any remaining template by solvent extraction from the heat treated precipitate; and
   (h) calcining the precipitate at a temperature between 673° K and 973° K in air for at least 4 hours to remove any remaining template and cross-link the composition, wherein the composition has a disordered assembly of worm channels.

48. The method of claim 47 wherein the calcining is by combustion in air.

49. In a method for cracking a petroleum product using a catalyst, the improvement which comprises using a catalyst which is a synthetic, semi-crystalline inorganic oxide composition having at least one resolved x-ray reflection corresponding to a lattice spacing of 3 to 10 nm, a framework wall thickness of at least about 2 nm, framework confined pores between about 2 and 10 nm, an elementary particle size greater than 500 nm, and a specific surface area of 300 to 1400 square meters per gram and having a disordered assembly of worm channels.

50. The method of claim 49 wherein the inorganic oxide is alumina.

* * * * *

UNITED STATES PATENT AND TRADEMARK OFFICE
CERTIFICATE OF CORRECTION

PATENT NO. : 5,795,559

DATED : August 18, 1998

INVENTOR(S) : Thomas J. Pinnavaia and Stephen A. Bagshaw

It is certified that error appears in the above—identified patent and that said Letters Patent is hereby corrected as shown below:

Title Page under references cited, last line, "Pinnavala et al" should be --Pinnavaia et al--.

First page, Abstract, line 6, "(I$^\square$)" should be --(I°)--.

Column 8, line 5, "minus 200°" should be --minus 20°--.

Column 10, line 30, "A,G,Si,D" should be --A,B,Si,D--.

Column 10, line 32, "0.0015 ≤V≤2" should be --0.001 ≤V≤2 --.

Column 10, line 34, "comosition" should be --composition--.

Column 14, Table 1, last column header "$(m^2g^{-1}$" should be --$(m^2g^{-1})$--.

Column 16, line 60, "concentrations of 50%, 10%" should be --concentrations of 5%, 10%--.

Column 17, Table 4, 2nd column headers", "Template formula" should be --Template formula$^b$--.

Column 17, Table 5, last column header, "$(m^2g^{-1}$", should be --$(m^2g^{-1})$ --.

Column 19, line 15, "Horvath-K awazoe" should be --Horvath-Kawazoe--.

UNITED STATES PATENT AND TRADEMARK OFFICE
CERTIFICATE OF CORRECTION

PATENT NO. : 5,795,559
DATED : August 18, 1998
INVENTOR(S) : Thomas J. Pinnavaia and Stephen A. Bagshaw It is certified that error appears in the above—identified patent and that said Letters Patent is hereby corrected as shown below:

Column 19, lines 44-45, "preported" should be --reported--.

Column 19, line 59, "from these NO" should be --from these N°--.

Column 20, line 36, "Horvath-K awazoe" should be --Horvath-Kawazoe--.

Column 21, line 60, "The resonances at δ-35 and" should be --The resonances at δ-0 and--.

Column 21, line 61, "four-sites coordinated" should be --four-coordinated --.

Column 26, Claim 45, step (j)), "form the composition " should be --from the composition--.

Signed and Sealed this

Twelfth Day of January, 1999

Attest:

Attesting Officer

*Acting Commissioner of Patents and Trademarks*